US010948981B2

(12) United States Patent
Sinay et al.

(10) Patent No.: US 10,948,981 B2
(45) Date of Patent: Mar. 16, 2021

(54) METHOD AND SYSTEM FOR EYE TRACKING USING SPECKLE PATTERNS

(71) Applicant: Magic Leap, Inc., Plantation, FL (US)

(72) Inventors: Asif Sinay, Tel-Aviv (IL); Barak Freedman, Binyamina (IL); Evyatar Bluzer, Yuvalim (IL)

(73) Assignee: Magic Leap, Inc., Plantation, FL (US)

( * ) Notice: Subject to any disclaimer, the term of this patent is extended or adjusted under 35 U.S.C. 154(b) by 18 days.

(21) Appl. No.: 15/805,635

(22) Filed: Nov. 7, 2017

(65) Prior Publication Data

US 2018/0129282 A1 May 10, 2018

Related U.S. Application Data

(60) Provisional application No. 62/420,292, filed on Nov. 10, 2016.

(51) Int. Cl.
*H04N 5/232* (2006.01)
*G06F 3/01* (2006.01)
(Continued)

(52) U.S. Cl.
CPC ......... *G06F 3/013* (2013.01); *G01N 21/4788* (2013.01); *G02B 27/0093* (2013.01);
(Continued)

(58) Field of Classification Search
CPC ............ G02B 27/0172; G02B 27/0093; G02B 2027/014; G02B 2027/0187; G02B 27/017; G02B 2027/0138; G02B 2027/0178; G02B 2027/0174; G02B 27/0179; G02B 2027/0127; G02B 2027/0134; G02B 27/48; G02B 2027/0123; G02B 2027/0112; G02B 2027/0118; G02B 2027/013; G02B 26/0833; G02B 26/101; G02B 27/01;
(Continued)

(56) References Cited

U.S. PATENT DOCUMENTS 9,911,046 B1 * 3/2018 Yakimenko .......... G06K 9/4604
2010/0226543 A1 * 9/2010 Zalevsky ............... A61B 5/024
380/107
(Continued)

FOREIGN PATENT DOCUMENTS

WO 2014188149 A1 11/2014

OTHER PUBLICATIONS

PCT/US2017/060303, "PCT Search Report", dated Jan. 5, 2018, 8 pages.
(Continued)

*Primary Examiner* — Dave Czekaj
*Assistant Examiner* — Samuel D Fereja
(74) *Attorney, Agent, or Firm* — Kilpatrick Townsend & Stockton LLP

(57) ABSTRACT

A method of tracking movement of an eye of a user includes directing a light beam at the eye. The eye may reflect a portion of the light beam. The method further includes detecting a plurality of speckle patterns formed at a detector by the portion of the light beam reflected by the eye. The plurality of speckle patterns may be detected at a predetermined frame rate. The method further includes tracking movement of the eye by tracking the plurality of speckle patterns from frame to frame.

19 Claims, 24 Drawing Sheets

(51) Int. Cl.
    *G02B 27/00*     (2006.01)
    *G06T 7/262*     (2017.01)
    *G06T 7/32*     (2017.01)
    *G01N 21/47*     (2006.01)
    *G02B 27/01*     (2006.01)
    *G06T 7/20*     (2017.01)

(52) U.S. Cl.
    CPC ............ *G02B 27/0172* (2013.01); *G06T 7/20* (2013.01); *G06T 7/262* (2017.01); *G06T 7/32* (2017.01); *H04N 5/232* (2013.01); *H04N 5/23245* (2013.01); *G01N 2021/479* (2013.01); *G02B 2027/0138* (2013.01); *G06T 2207/10048* (2013.01); *G06T 2207/30041* (2013.01)

(58) Field of Classification Search
    CPC ............ G02B 27/0101; G02B 27/0103; G02B 27/0176; G02B 6/0016; G02B 6/34; G02B 2027/0147; G02B 2027/0152; G02B 5/18; G02B 2027/0105; G02B 2027/011; G02B 2027/0125; G02B 2027/0159; G02B 26/0875; G02B 27/0075; G02B 27/0081; G02B 27/2214; G02B 27/225; G02B 27/2292; G02B 5/3083; G02B 5/32; G02B 6/4206; G02B 6/4287; G02B 2027/0121; G02B 2027/0145; G02B 2027/015; G02B 2027/0181; G02B 2027/0183; G02B 26/06; G02B 26/08; G02B 26/0808; G02B 26/0816; G02B 26/085; G02B 26/0866; G02B 26/10; G02B 26/105; G02B 26/12; G02B 27/00; G02B 27/0037; G02B 27/0149; G02B 27/0189; G02B 27/10; G02B 27/104; G02B 27/106; G02B 27/142; G02B 27/2228; G02B 27/2242; G02B 27/2271; G02B 27/30; G02B 27/4205; G02B 27/58; G02B 3/0056; G02B 3/12; G02B 3/14; G02B 5/02

See application file for complete search history.

(56) References Cited

U.S. PATENT DOCUMENTS

| | | | |
|---|---|---|---|
| 2013/0315491 A1* | 11/2013 | Konofagou | ............ A61B 5/055 382/209 |
| 2015/0002650 A1 | 1/2015 | Yoshimura et al. | |
| 2015/0289762 A1 | 10/2015 | Popovich et al. | |
| 2016/0209657 A1 | 7/2016 | Popovich et al. | |
| 2017/0131765 A1* | 5/2017 | Perek | ................... G02B 5/3083 |
| 2018/0232048 A1* | 8/2018 | Popovich | ............ G02B 27/017 |

OTHER PUBLICATIONS

EP17869673.8, "Extended European Search Report", dated Sep. 27, 2019, 6 pages.

IL266390, "Office Action", English Translation, dated Dec. 1, 2020, 8 pages.

\* cited by examiner

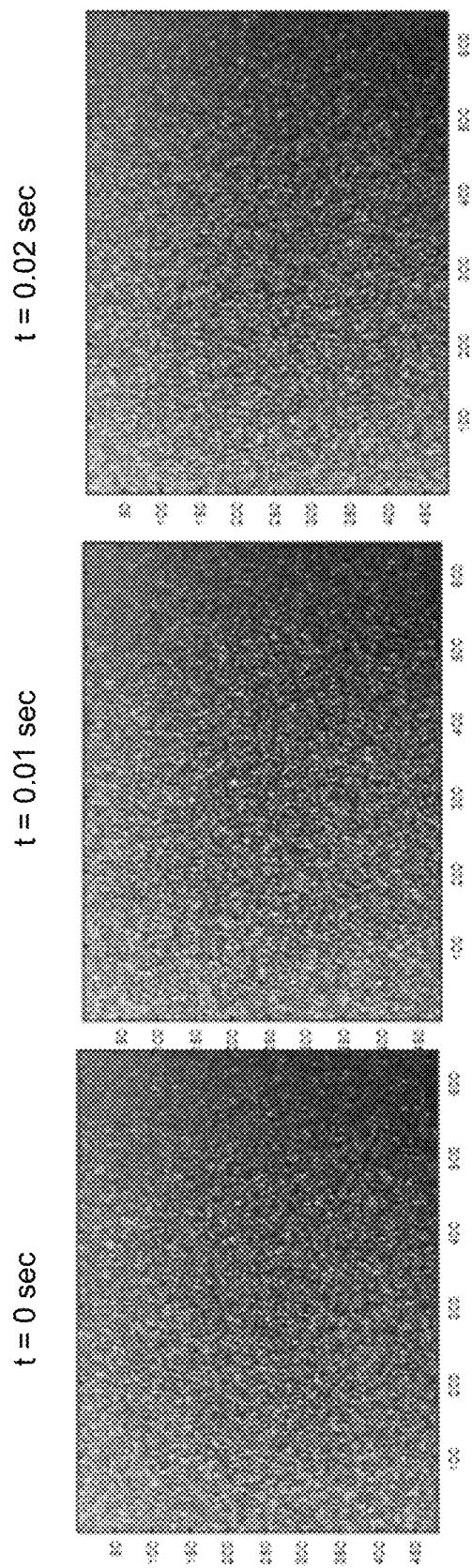

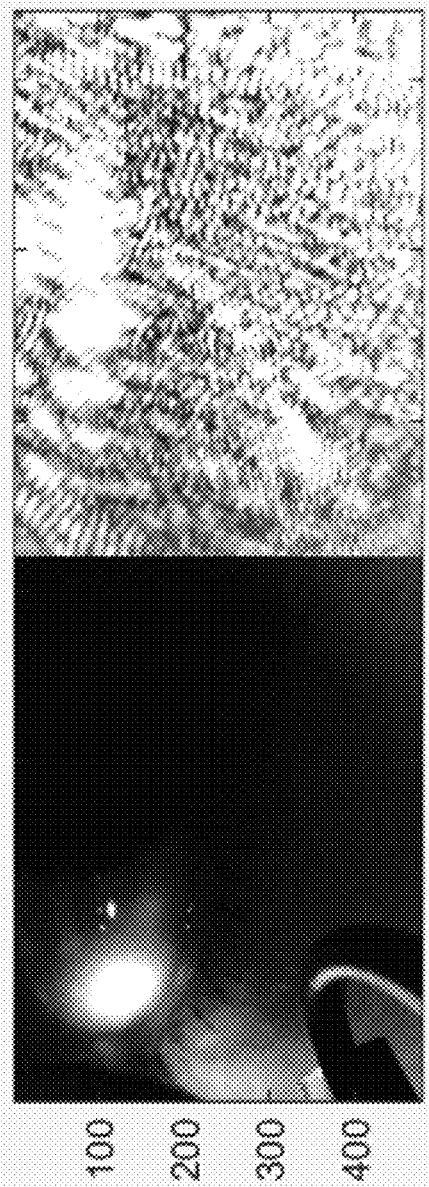
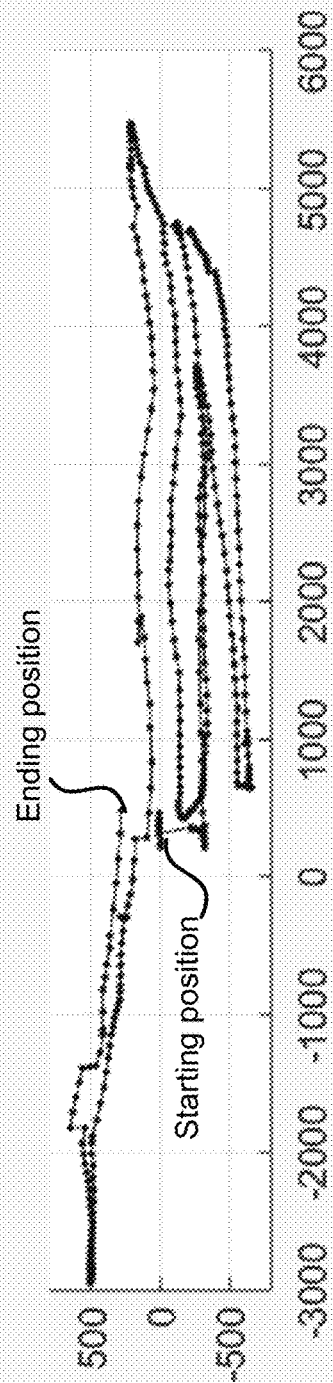
FIG. 11A  FIG. 11B
FIG. 11C

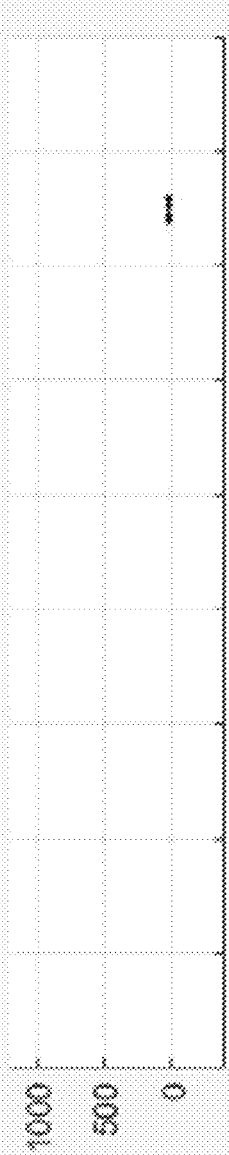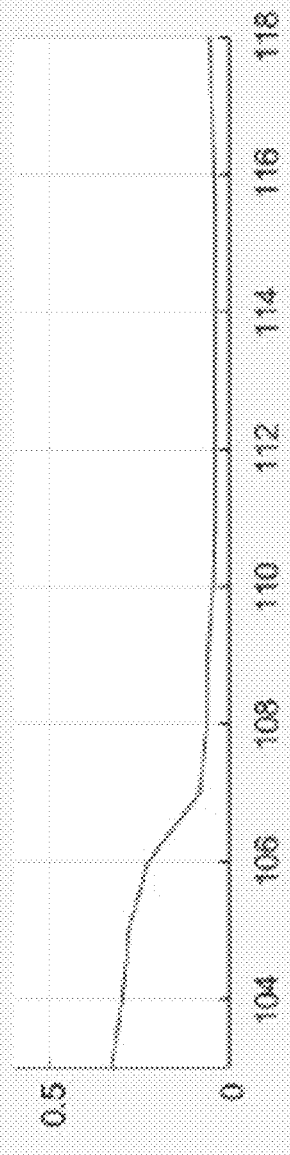
FIG. 15A
FIG. 15B
FIG. 15C

METHOD AND SYSTEM FOR EYE TRACKING USING SPECKLE PATTERNS

CROSS-REFERENCES TO RELATED APPLICATIONS

This application claims the benefit of U.S. Provisional Patent Application No. 62/420,292, filed on Nov. 10, 2016, the contents of which is incorporated by reference in its entirety.

BACKGROUND OF THE INVENTION

Eye-gaze tracking technology can be applied to many fields. For example, eye-gaze tracking may be useful for building a virtual reality (VR) or augmented reality (AR) headset for providing accurate three-dimensional renderings to a user. Other applications may include human-computer interfaces for assisting disabled people, activity recognition, image and video compression, computer vision, cognitive studies in medical research, laser refractive surgery, vehicle simulators for in-vehicle research, training simulators including sports training simulators, fatigue detection, and the like. Despite the progress made in the development of eye-gaze tracking technology, there is a need in the art for improved eye-gaze tracking methods.

SUMMARY OF THE INVENTION

The present invention relates generally to methods and systems for eye-gaze tracking. More specifically, the present invention relates to methods and systems for eye-gaze tracking using speckle patterns.

According to an embodiment of the present invention, a method of tracking movement of an eye of a user includes directing a light beam at the eye. The eye may reflect a portion of the light beam. The method further includes detecting a plurality of speckle patterns formed at a detector by the portion of the light beam reflected by the eye. The plurality of speckle patterns may be detected at a predetermined frame rate. The method further includes tracking movement of the eye by tracking the plurality of speckle patterns from frame to frame.

According to another embodiment of the present invention, a method of tracking a gaze of an eye of a user includes recording a first plurality of images of the eye using a camera at a first frame rate, and determining a starting position of the eye based on the first plurality of images of the eye. The method further includes directing a light beam at the eye. The eye may reflect a portion of the light beam. The method further includes detecting a first plurality of speckle patterns formed at a detector by the portion of the light beam reflected by the eye. The plurality of speckle patterns may be detected at a second frame rate greater than the first frame rate. The method further includes tracking movement of the eye relative to the starting position by tracking the first plurality of speckle patterns from frame to frame.

According to yet another embodiment of the present invention, a method of tracking a gaze of an eye of a user includes obtaining a pre-calibrated speckle map of the eye of the user, determining a starting position of the eye using the pre-calibrated speckle map, and tracking movement of the eye relative to the starting position. In one embodiment, obtaining a pre-calibrated speckle map of the eye of the user is performed by: directing a first light beam at the eye, detecting a plurality of first speckle patterns formed at a detector by the portion of the first light beam reflected by the eye, each of the plurality of first speckle patterns corresponding to a respective first position of the eye, recording a plurality of images of the eye using a camera, each of the plurality of images of the eye being recorded when a respective first speckle pattern is detected, determining the respective first position of the eye corresponding to each respective first speckle pattern based on the respective image of the eye, and storing the plurality of first speckle patterns and the corresponding first positions of the eye. In one embodiment, determining a starting position of the eye using the pre-calibrated speckle map is performed by: directing a second light beam at the eye, the eye reflecting a portion of the second light beam, detecting a plurality of second speckle patterns formed at the detector by the portion of the second light beam reflected by the eye, and determining the starting position of the eye based on comparisons between the plurality of second speckle patterns and the stored plurality of first speckle patterns and the stored corresponding first positions of the eye. In one embodiment, tracking movement of the eye relative to the starting position is performed by: directing a third light beam at the eye, the eye reflecting a portion of the third light beam, detecting a plurality of third speckle patterns formed at the detector by the portion of the third light beam reflected by the eye, the plurality of third speckle patterns being detected at a predetermined frame rate, and tracking movement of the eye relative to the starting position by tracking the third plurality of speckle patterns from frame to frame.

In a further embodiment of the present invention, a method of identification of a user includes obtaining a pre-calibrated speckle map of a first eye of a first user by: directing a first light beam at the first eye, the first eye reflecting a portion of the first light beam, detecting a plurality of first speckle patterns formed at a detector by the portion of the first light beam reflected by the first eye, each of the plurality of first speckle patterns corresponding to a respective first position of the first eye, recording a plurality of images of the first eye using a camera, each of the plurality of images of the first eye being recorded when a respective first speckle pattern is detected, determining the respective first position of the first eye corresponding to each respective first speckle pattern based on the respective image of the first eye, and storing the plurality of first speckle patterns and the corresponding first positions of the first eye. The method further includes directing a second light beam at an eye of a user, the eye reflecting a portion of the second light beam, detecting a plurality of second speckle patterns formed at the detector by the portion of the second light beam reflected by the eye, each of the plurality of second speckle patterns corresponding to a respective second position of the eye, and determining that the user is the first user by comparing the plurality of second speckle patterns with the plurality of first speckle patterns. In some embodiments, each of the portion of the first light beam reflected by the eye and the portion of the second light beam reflected by the eye is diffusely reflected or specular reflected by the eye.

Numerous benefits are achieved by way of the present invention over conventional techniques. For example, embodiments of the present invention can provide methods and systems for accurate detection of small eye-gaze movements, for example at a micron scale or less, by tracking the movements of speckle patterns. Eye-gaze tracking using speckles can be very robust and the tracking quality can be relatively insensitive to sensor location with respect to the eye. The methods of eye-gaze tracking according to embodiments of the present invention may afford lower power consumption as compared to conventional methods, because of less amount of computation and less number of light sources are required (e.g., only one light is required compared to four LEDs typically needed in camera-based eye-tracking). The methods may also afford lower cost as they only require one light source and one detector, and do not require a camera lens.

These and other embodiments of the invention, along with many of its advantages and features, are described in more detail in conjunction with the text below and attached figures.

BRIEF DESCRIPTION OF THE DRAWINGS

FIGS. 10A-10C show three consecutive frames of the detector captured at 10 ms intervals illustrating how a speckle pattern may be formed on a detector.

FIG. 11A shows a snapshot of a front view of an eye captured by an eye camera, according to an embodiment of the present invention.

FIG. 11B shows a snapshot of a speckle pattern generated of the eye captured by the detector at the same time as the snapshot of the front view of the eye shown in FIG. 10A was captured, according to an embodiment of the present invention.

FIG. 11C shows the trajectory of the eye movement from a starting position to an end position, according to an embodiment of the present invention.

FIGS. 15A-15C are similar to FIGS. 14A-14C but are snapshots of a different time, according to an embodiment of the present invention.

DETAILED DESCRIPTION OF SPECIFIC EMBODIMENTS

Figure 1:
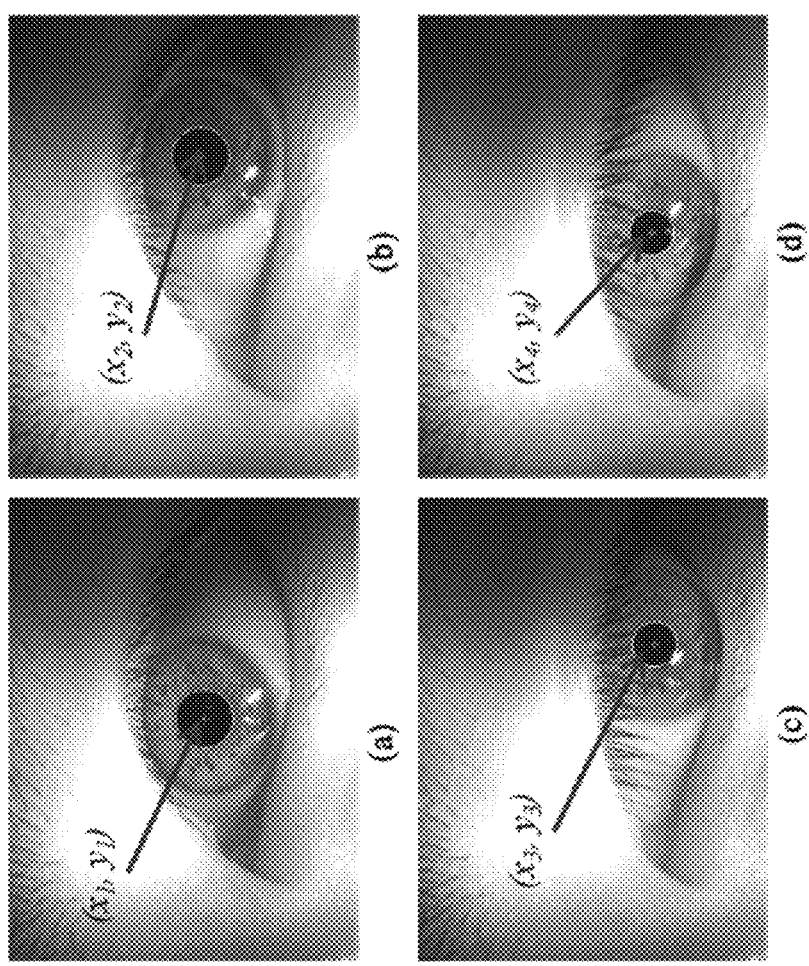
FIG. 1 shows four images (a)-(d) of an eye captured when the eye gazes at various positions.

The present invention relates generally to methods and systems for eye-gaze tracking. More particularly, the present invention relates to methods and systems for eye-gaze tracking using speckle patterns. The most widely used current designs are video-based eye trackers, also referred to as passive tracking. A camera focuses on one or both eyes and records their movement as the viewer looks at some kind of stimulus. FIG. 1 shows four images (a)-(d) of an eye captured when the eye gazes at various positions. By tracking the (x, y) coordinates of the center of the pupil, the eye gaze may be monitored.

Most modern eye-trackers use the center of the pupil and infrared such as near-infrared non-collimated light to create corneal reflections (CR). The vector between the pupil center and the corneal reflections can be used to compute the point of regard on surface or the gaze direction. Two general types of infrared or near-infrared (also known as active light) eye tracking techniques are used: bright-pupil and dark-pupil. Their difference is based on the location of the illumination source with respect to the optics. If the illumination is coaxial with the optical path, then the eye acts as a retroreflector as the light reflects off of the retina creating a bright pupil effect similar to red eye. If the illumination source is offset from the optical path, then the pupil appears dark because the reflection from the retina is directed away from the camera.

Figure 2:
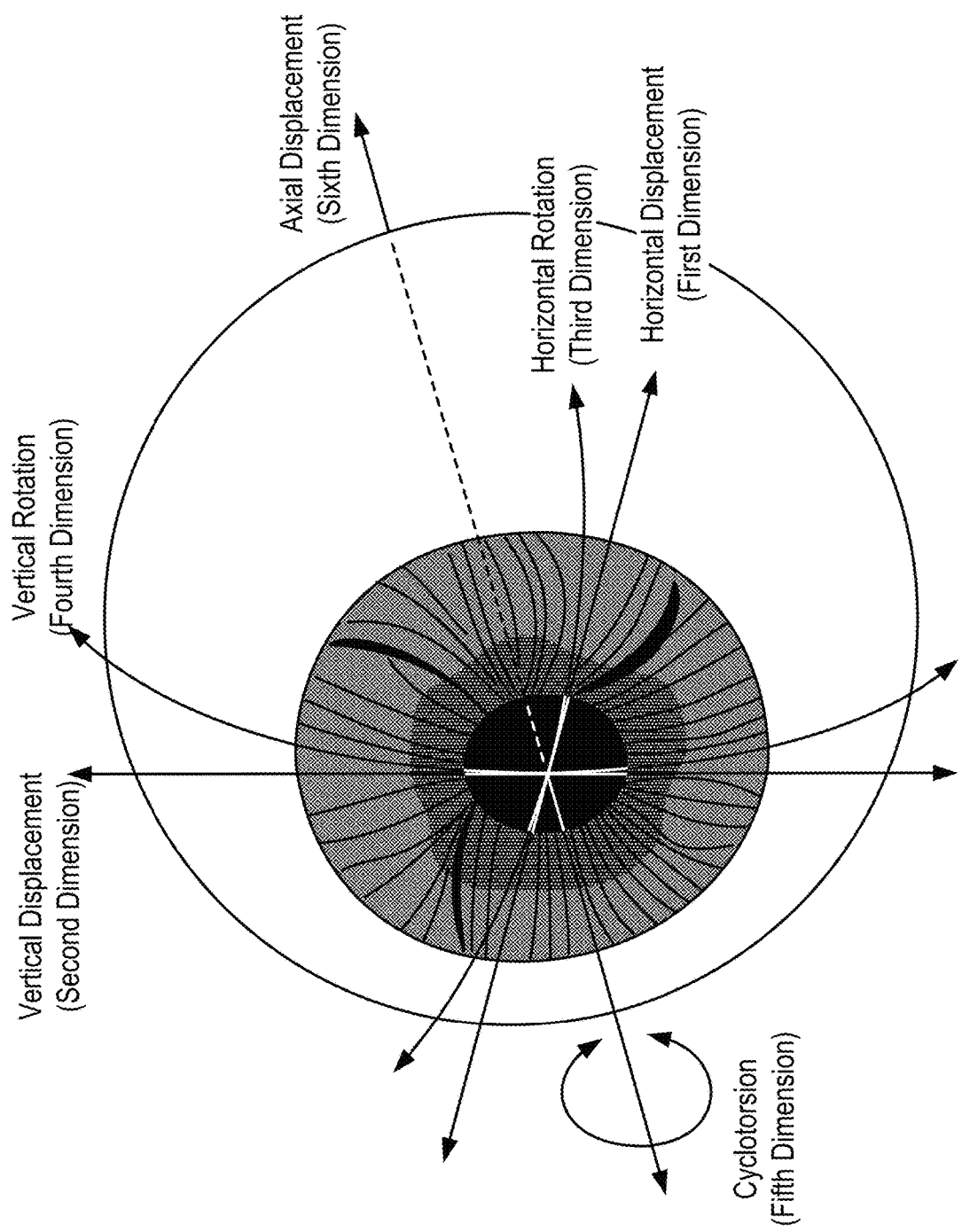
FIG. 2 illustrates schematically eye movements along three independent axes.

FIG. 2 illustrates schematically possible eye movements along three independent axes: horizontal displacement (first dimension), vertical displacement (second dimension), horizontal rotation (third dimension), vertical rotation (fourth dimension), cyclotorsion (fifth dimension), and axial displacement (sixth dimension).

Figure 3:
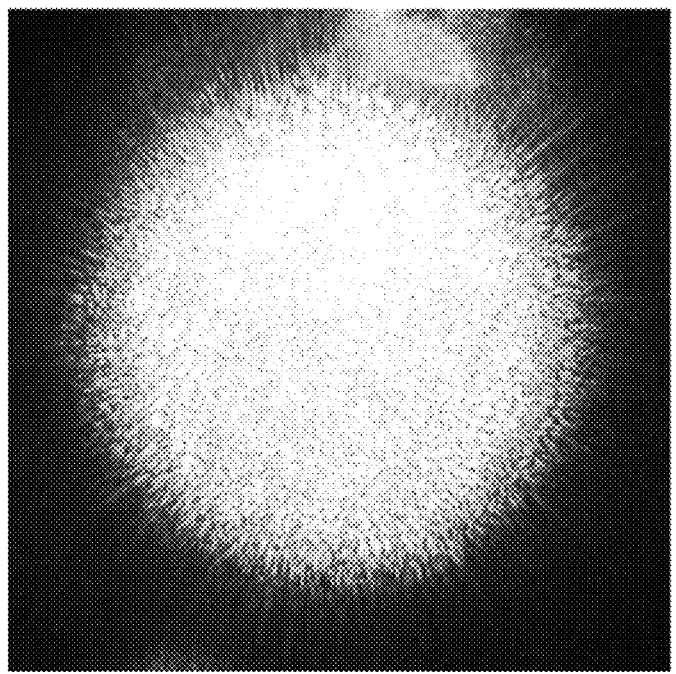
FIG. 3 illustrates an exemplary speckle pattern generated from a laser pointer.

Embodiments of the present invention provide methods and systems for tracking eye gaze using speckle patterns. A speckle pattern is an intensity pattern produced by the mutual interference of a set of wavefronts. Speckle patterns typically occur in diffuse reflections of monochromatic light such as laser light. The speckle effect is a result of the interference of many waves of the same frequency, having different phases and amplitudes, which add together to give a resultant wave whose amplitude, and therefore intensity, varies randomly. FIG. 3 illustrates an exemplary speckle pattern generated from a green laser pointer.

Figure 4:
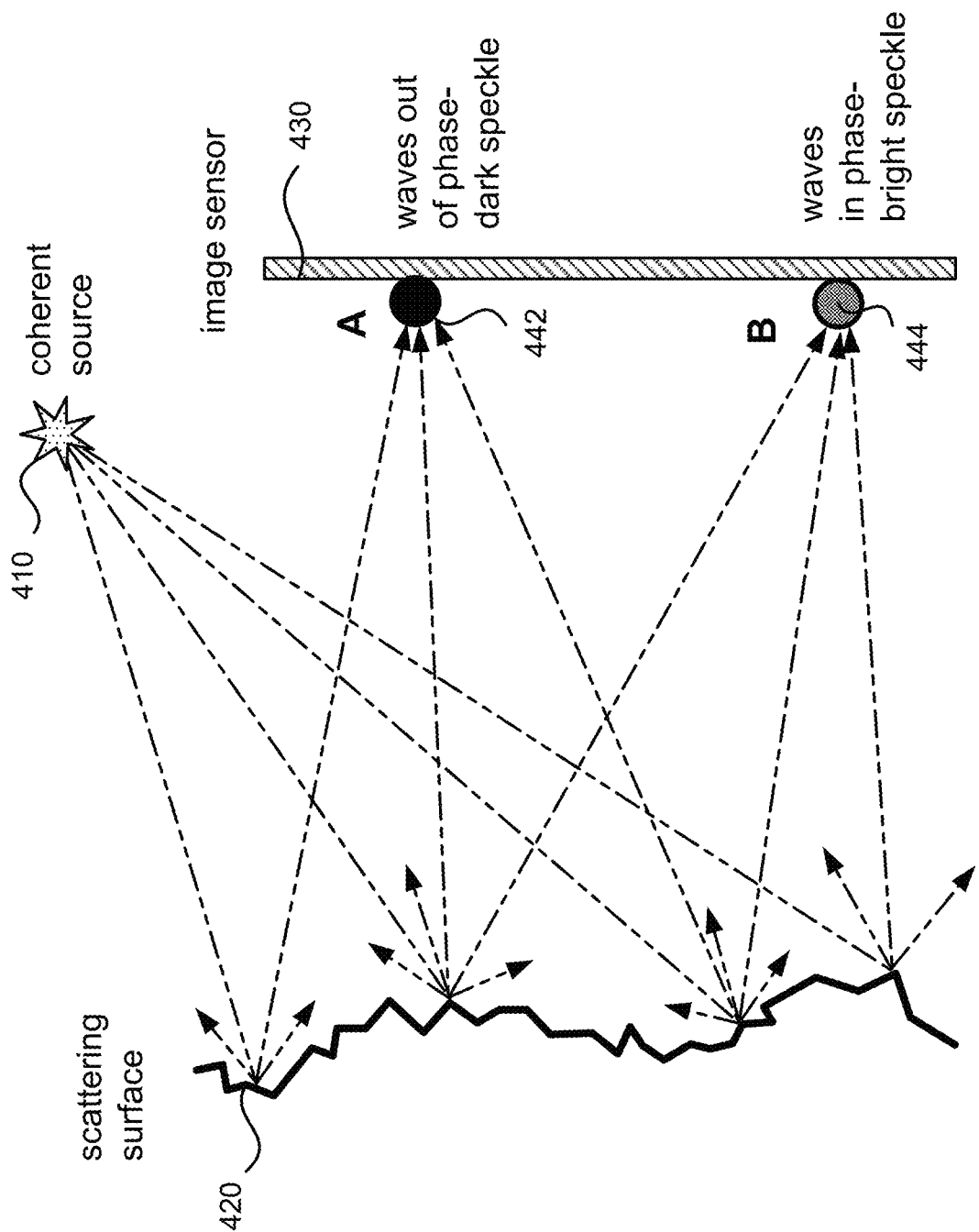
FIG. 4 illustrates schematically how a speckle pattern may be formed on an image sensor.

FIG. 4 illustrates schematically how a speckle pattern may be formed on an image sensor 430. When a surface 420 is illuminated by a coherent light source 410 such as a laser, according to diffraction theory, each point on an illuminated surface acts as a source of secondary spherical waves. The light at any point in the scattered light field is made up of waves which have been scattered from each point on the illuminated surface 420. If the surface 420 is rough enough to create path-length differences exceeding one wavelength, giving rise to phase changes greater than $2\pi$, the amplitude, and hence the intensity, of the resultant light varies randomly. For example, as illustrated in FIG. 4, the scattered light waves may interfere out of phase with respect to each other and result in a dark speckle 442 at certain positions (e.g., at point A) on the image sensor 430. Likewise, the scattered light waves may interfere in phase with respect to each other and result in a bright speckle 444 at certain positions (e.g., at point B) on the image sensor 430. Thus, a speckle pattern may be viewed as a hologram generated by a rough surface.

When a rough surface which is illuminated by a coherent light (e.g. a laser beam) is imaged, a speckle pattern is observed in the image plane; this is called a "subjective speckle pattern." It is called "subjective" because the detailed structure of the speckle pattern depends on the viewing system parameters. For instance, if the size of the lens aperture changes, the size of the speckles change. When coherent light which has been scattered off a rough surface falls on another surface, it forms an "objective speckle pattern." If a photographic plate or another 2-D optical sensor is located within the scattered light field without a lens, an objective speckle pattern is obtained whose characteristics depend on the geometry of the system and the wavelength of the coherent light source.

Embodiments of the present invention include methods and systems for tracking movement of an eye by directing a light beam at the eye and tracking movements of speckle patterns formed by diffuse and specular reflections of the light beam by the eye. Using speckle patterns to track eye gaze may afford several advantages. While the texture of the surface of an eyeball may be too smooth to be detected by other means, it can generate observable speckle patterns. Speckle patterns would move relative to a sensor when the eyeball is moved, as the speckle patterns are generated by the eyeball and are therefore fixed to the eyeball. By tracking the movements of speckle patterns, it may be possible to accurately detect small movements of the eyeball, for example at a micron scale or less.

Figure 5:
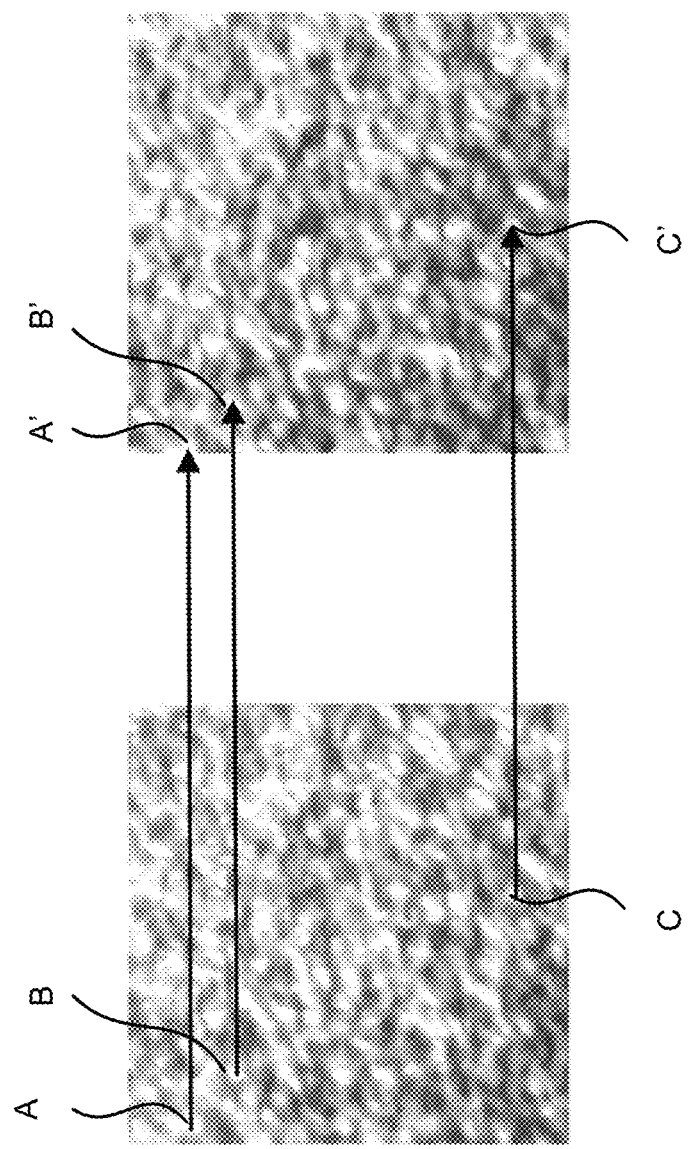
FIGS. 5A and 5B show two snapshots of a speckle pattern taken at a small time interval with respect to each other.

FIGS. 5A and 5B show two snapshots of a speckle pattern on a detector captured at a small time interval with respect to each other, where the target moved by a small distance during the time interval. As can be seen, the speckle pattern has moved with respect to the detector. For example, the bright spot at position A in FIG. 5A is moved toward the left to position A' near an edge of the detector in FIG. 5B. Similarly the bright spots at position B and C in FIG. 5A are also moved toward the left to positions B' and C', respectively, in FIG. 5B. In order to track the movements of a speckle pattern, it may be desired that the beam spot movement on the target between frames is much less than the beam spot size, and that the speckle movement on the detector between frames is much less than the detector size. For example, in some embodiments, a beam spot size ranging from about 5 mm to about 10 mm may be utilized. As the eye moves between frames, the position of the beam spot on the eye moves accordingly. For example, for a frame rate of 1000 frames per second (fps) given a beam spot size of 5 mm, movement of the eye at a rate of about 5,000 mm per second will be within the beam spot size. Similarly, the speckle pattern on a detector also moves accordingly as the eye moves between frames. Thus, it may be advantageous to use a fast detector, for example, a detector operating at a rate of 1000 fps or faster, so that the above requirements are satisfied.

Figure 6:
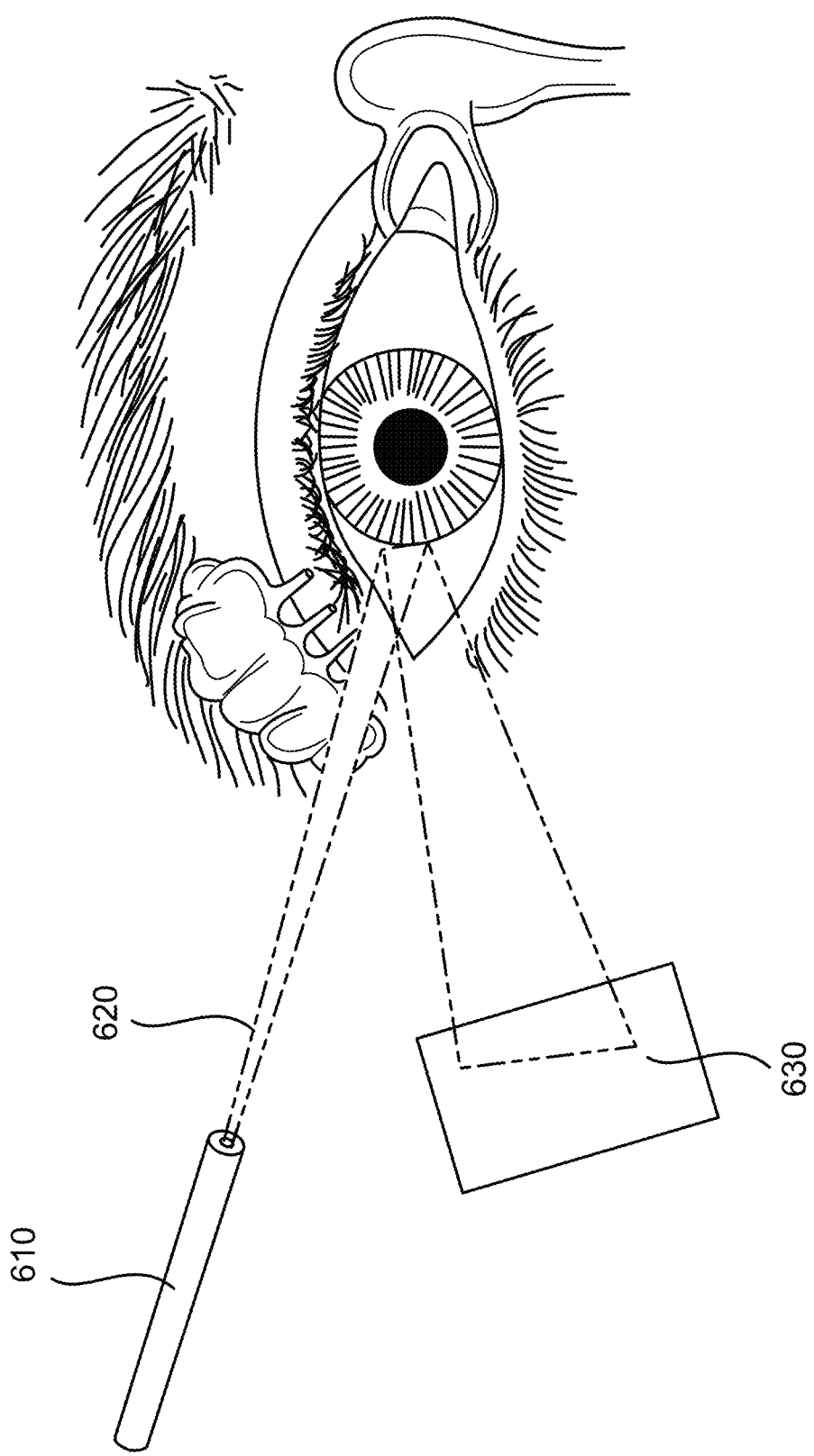
FIG. 6 illustrates schematically an exemplary setup for eye gaze tracking according to an embodiment of the present invention.
Figure 7:
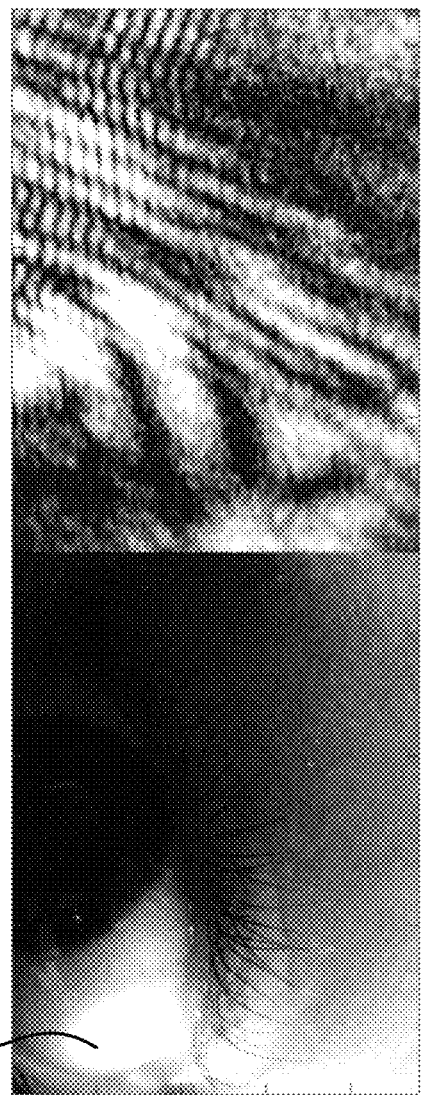
FIG. 7A shows a front view of an eye captured by a camera according to an embodiment of the present invention.
FIG. 7B shows a speckle pattern captured by a detector according to an embodiment of the present invention.

FIG. 6 illustrates schematically an exemplary setup for eye-gaze tracking according to an embodiment of the present invention. A light source 610 may shine a light beam 620 at an eye at a slanted angle. The eye may reflect a portion of the light beam 620. A detector 630 may be positioned adjacent the eye to detect speckle patterns formed by the portion of the light beam reflected by the eye. FIG. 7A shows a front view of the eye as captured by a camera. The bright spot 702 is the beam spot on the eye. FIG. 7B shows a speckle pattern as captured by the detector 620. As can be seen in FIG. 7B, interference fringes created by specular reflections are clearly visible in the speckle pattern. In some embodiments, the light source 610 may be configured to emit light beams in the infrared wavelength range. In some embodiments, the light source 610 may be configured to emit light beams in the near infrared wavelength range, e.g., 0.75-2 µm. In some embodiments, the light source 610 may comprise a coherent light source such as a laser source, or a partially coherent light source such as light emitting diodes (LEDs), so that speckle patterns may be detected.

Figure 8:
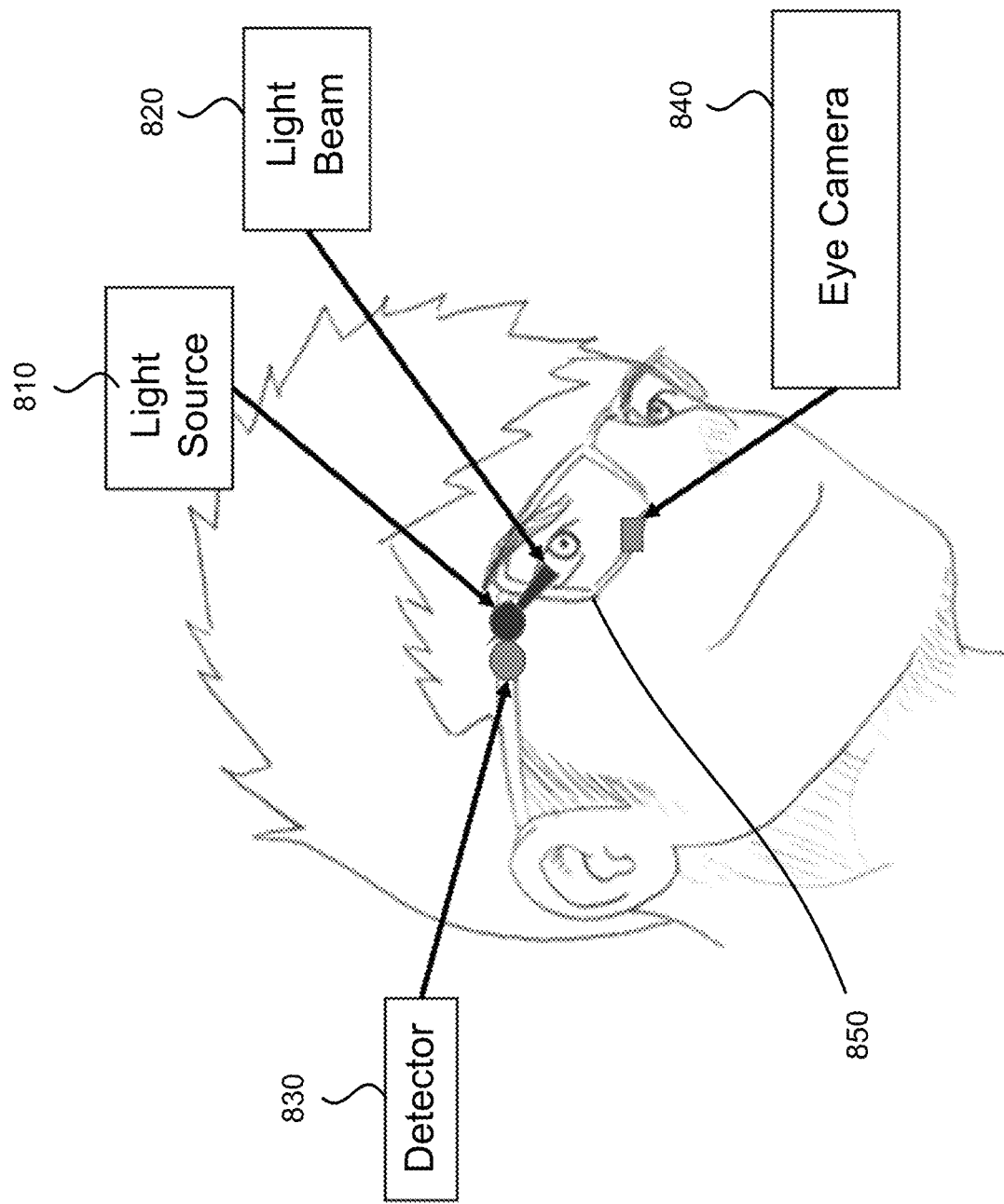
FIG. 8 shows a schematic diagram illustrating how a light source, a detector, and an optional eye camera may be mounted on a pair of eye glasses that can be worn by a user, according to an embodiment of the present invention.
Figure 9C:
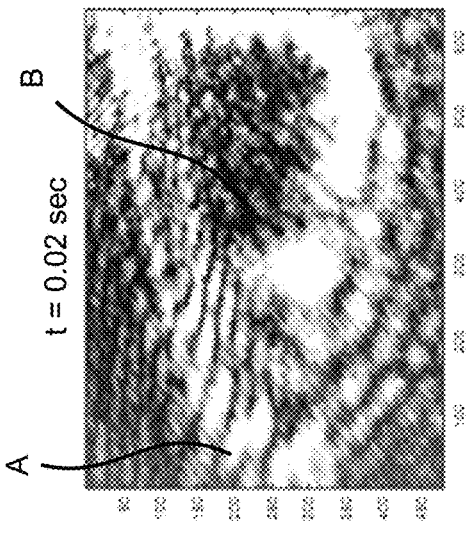
FIGS. 9A-9F show six sequential frames of speckle patterns of an eye, captured by the detector at 10 ms (i.e., 0.01 sec) time intervals as the eye moves from one side to another.
Figure 9B:
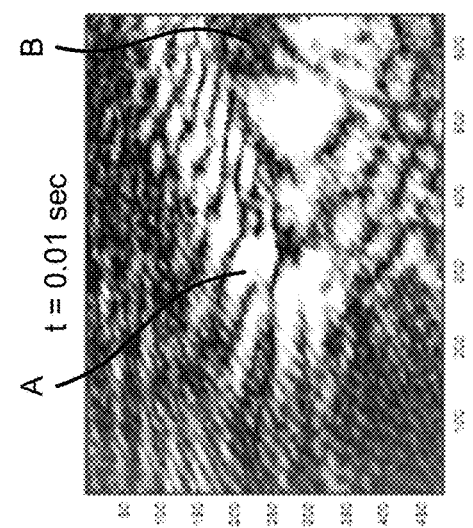
Figure 9A:
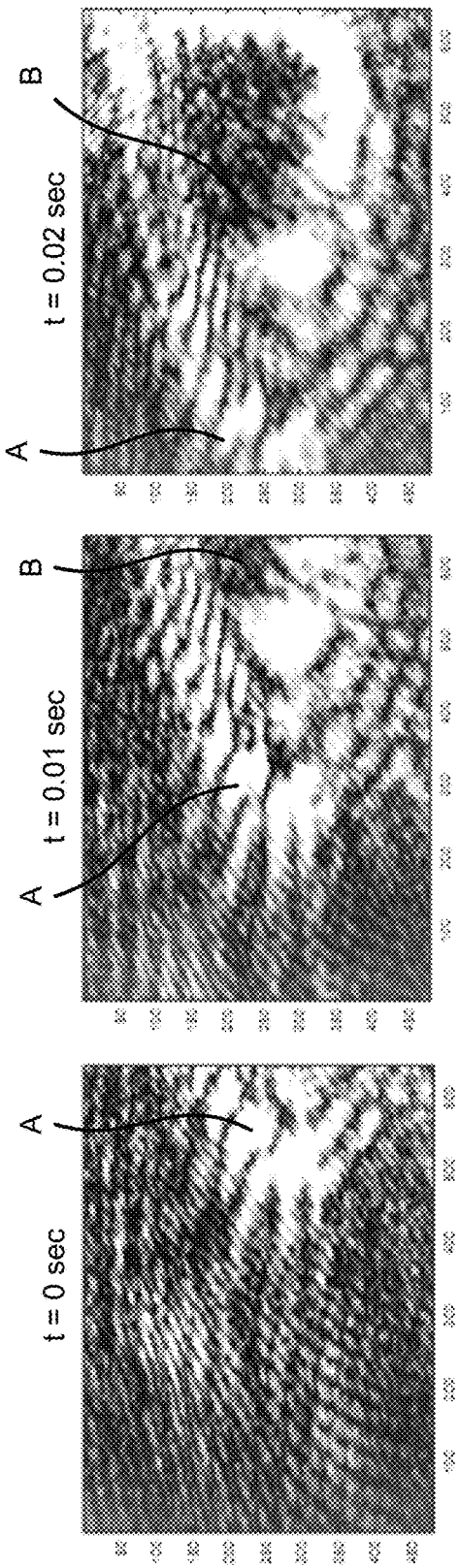
Figure 9F:
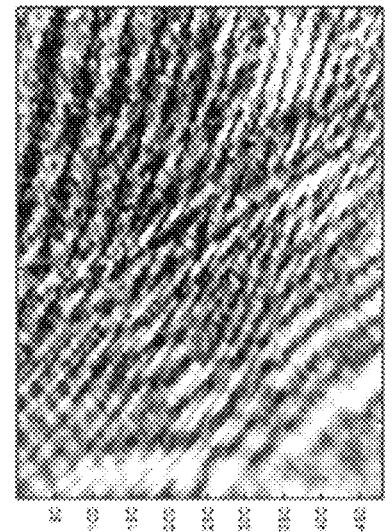
Figure 9E:
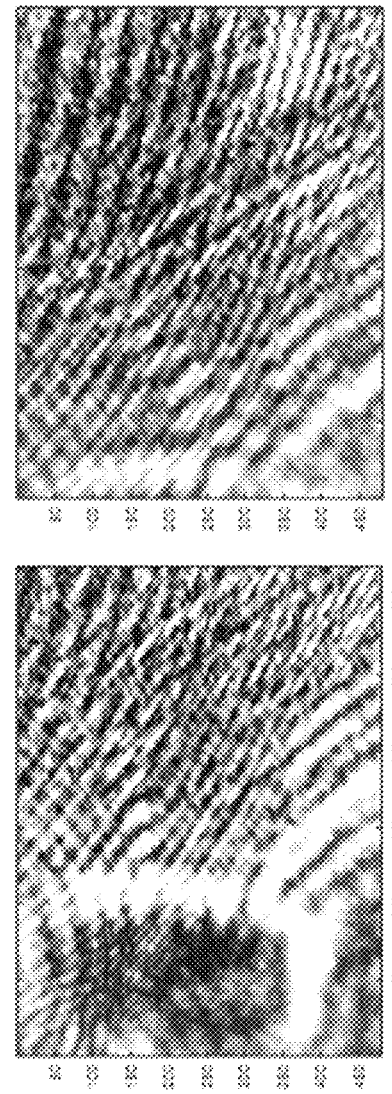
Figure 9D:
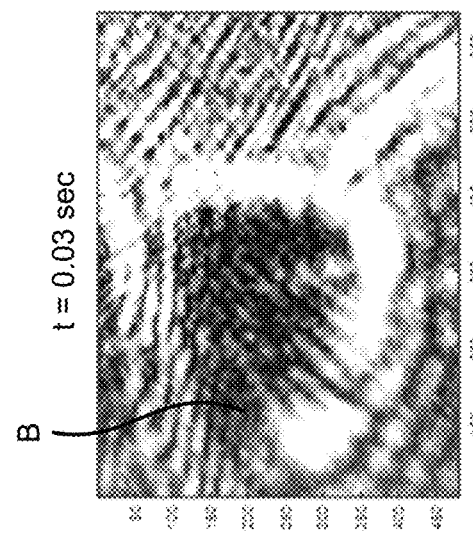

FIG. 8 shows a schematic diagram illustrating how a light source 810, a detector 830, and an optional eye camera 840 may be mounted on a pair of eye glasses 850 that can be worn by a user, according to an embodiment of the present invention. The light source 810 may shine a light beam 820 at an eye of the user. Diffuse and specular reflection of the light beam 820 by the eye may form speckle patterns at the detector 830. In some embodiments, the light source 810 may comprise a coherent light source such as a laser. The eye camera 840 may capture images of the eye, from which initial eye gaze positions may be determined, as discussed in more detail below.

FIGS. 9A-9F show six sequential frames of speckle patterns generated by the reflection of a light beam by an eye, captured by a detector at 10 ms (i.e., 0.01 sec) time intervals as the eye moves from one side to the other. As can be seen, the speckle patterns move across the detector area toward the left from FIG. 9A to FIG. 9F. For example, the bright region A in FIG. 9A gradually moves toward the left in FIGS. 9B and 9C, and then moves out of the detector area in FIGS. 9D-9F. Similarly, the dark region B in FIG. 9B just starts to appear in FIG. 9B and moves gradually toward the left in FIGS. 9C-9E, and then moves out of the detector area in FIG. 9F.

FIGS. 10A-10C show three consecutive frames of the detector captured at 10 ms intervals illustrating how speckle patterns may be formed on an image sensor. Here, although no interference fringes are visible, speckle patterns created by diffuse reflections of the eye are visible.

By tracking the movements of the speckle patterns, the movement of the eye may be tracked. According to some embodiments of the present invention, the movements of the speckle patterns may be tracked using an optical flow algorithm. Optical flow or optic flow is the pattern of apparent motion of objects, surfaces, and edges in a visual scene caused by the relative motion between an observer (an eye or a camera) and the scene. Sequences of ordered images may allow the estimation of motion as either instantaneous image velocities or discrete image displacements. Methods of determining optical flow may include phase correlation methods, block-based methods, differential methods, the Horn-Schunck method, the Buxton-Buxton method, the Black-Jepson method, and general variational methods, discrete optimization methods, and the like. According to an embodiment of the present invention, movements of the eye is tracked by applying a phase-correlation algorithm of optical flow to sequential frames of speckle patterns of the eye.

FIGS. 11A-11C illustrate some exemplary results of eye-gaze tracking according to an embodiment of the present invention. FIG. 11A shows a snapshot of video of a front view of the eye captured by an eye camera. FIG. 11B shows a snapshot of the speckle pattern of the eye captured by a detector at the same time as the snapshot of the front view of the eye was captured. FIG. 11C shows the trajectory of the eye movement from a starting point up to the end point where the snapshot of FIGS. 11A and 11B are obtained. The horizontal axis and vertical axis in FIG. 11C are horizontal position and vertical position, respectively, of the eye in arbitrary units (e.g., in terms of pixels of the detector). After calibration, the eye-gaze positions may be translated into gaze angles. The frame rate for detecting the speckle patterns is about 100 frames per second. The duration of the tracking is about 20 seconds. As can be seen in FIG. 11C, the movement of the eye is continuously tracked as the eye is moved back and forth to the right and to the left, and up and down.

Figure 12A:
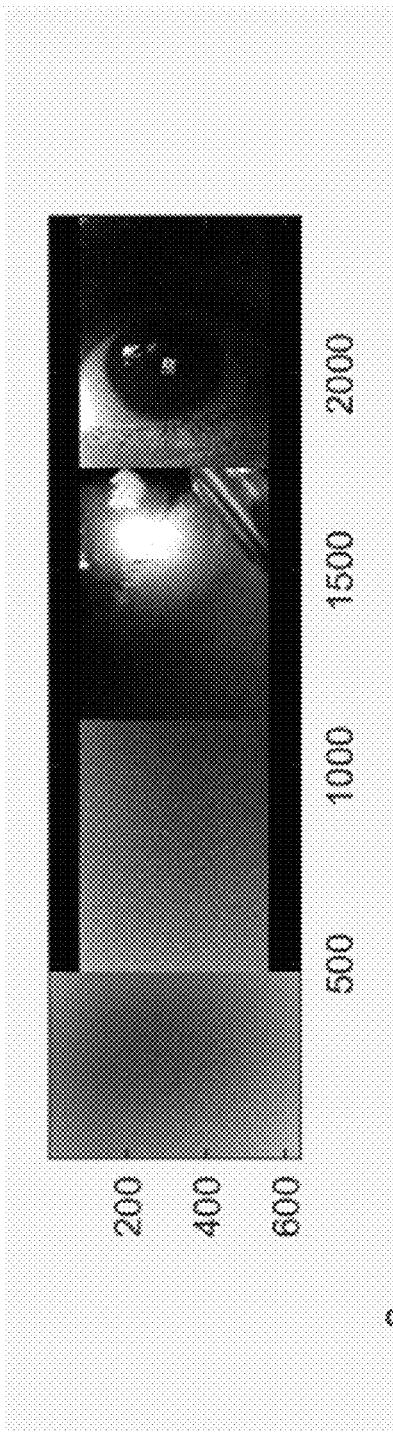
FIG. 12A shows snapshots of the speckle patterns at two different detectors (two left panels), and snapshots of a front view and a side view of the eye (two right panels) captured by two different cameras, according to an embodiment of the present invention.
Figure 12B:
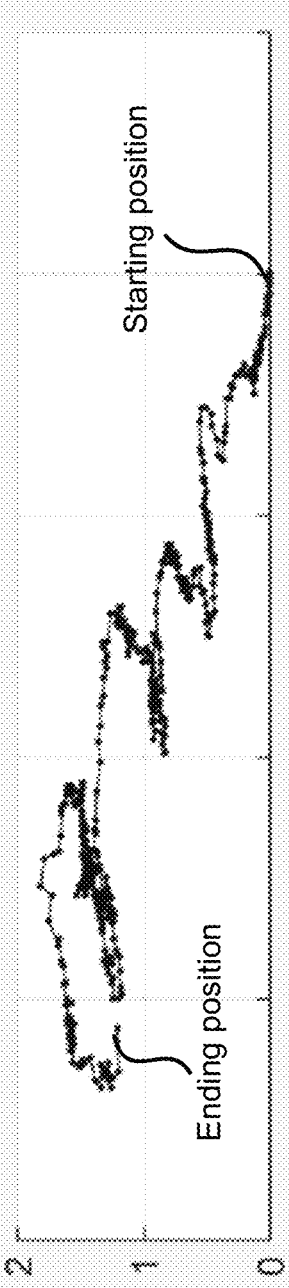
FIGS. 12B and 12C show the trajectories of the eye detected by the two detectors, respectively, according to an embodiment of the present invention.
Figure 12C:
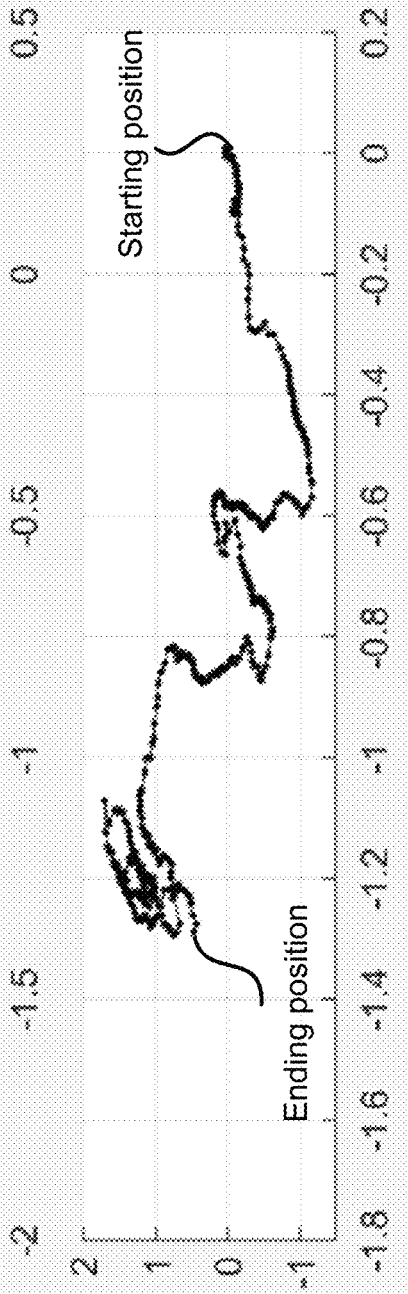

To show the robustness of the eye-gaze tracking using speckle patterns, two detectors may be positioned near the eye to track the eye's movements. FIG. 12A shows snapshots of the speckle patterns captured by two different detectors (two left panels), and snapshots of a front view and a side view of the eye (two right panels) captured by two different cameras. FIGS. 12B and 12C show the trajectories of the eye detected by the two detectors, respectively. The horizontal axis and vertical axis in FIGS. 12B and 12C are horizontal position and vertical position, respectively, of the eye in arbitrary units. The frame rate for detecting the speckle patterns is about 100 frames per second for each of the two detectors. The duration of the tracking is about 20 seconds. As can be seen, the two trajectories are consistent with each other, demonstrating that this method of eye-gaze tracking is fairly robust.

Figures 13A, 13B:
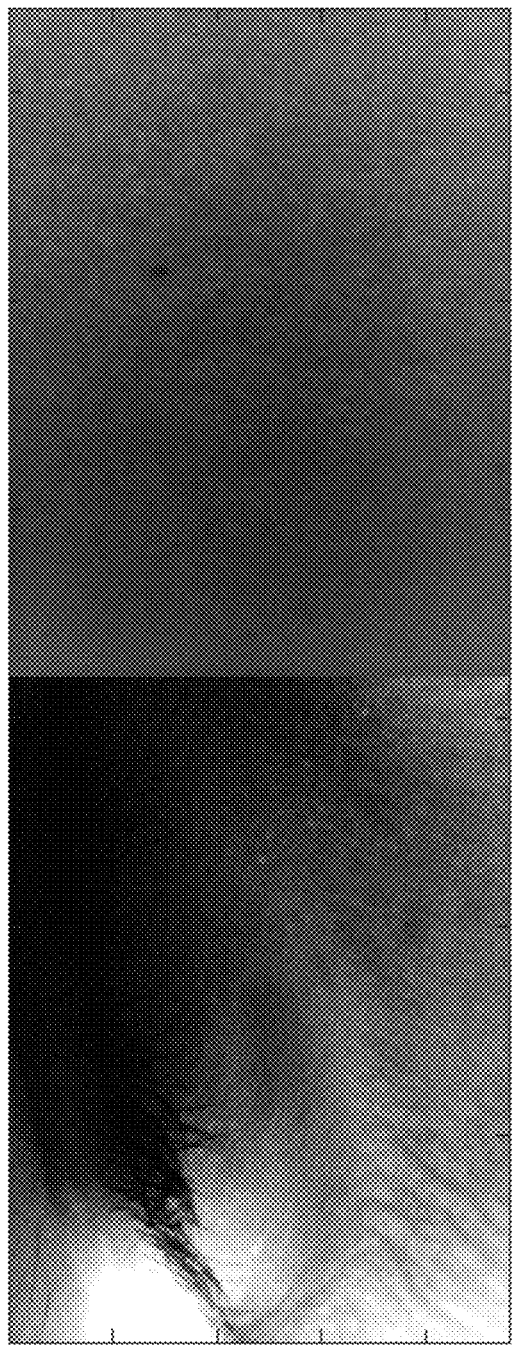
FIG. 13A shows a snapshot of a front view of an eye when it blinked according to an embodiment of the present invention.
FIG. 13B shows the image at the detector when the eye blinked according to an embodiment of the present invention.

According to embodiments of the present invention, movements of the eye may be continuously tracked by tracking the movements of the speckle patterns of the eye, as long as the eye does not blink. When the eye blinks, speckle patterns may disappear, and as a result, correlation between one frame to the next may be lost. FIG. 13A shows a snapshot of a front view of an eye when the eye blinked. FIG. 13B shows the image at the detector captured at the same time when the eye blinked. As can be seen in FIG. 13B, the speckle patterns are lost when the eye blinked. If the blinking lasted long enough, for example a few tens of milliseconds, the speckle patterns captured before and after the blinking may no longer have phase correlations with each other. As a result, eye-gaze tracking may be interrupted, as some algorithms such as the optical flow algorithms used for eye-gaze tracking according to some embodiments may require phase correlation between sequential frames.

According to some embodiments, a tracking quality score may be used as an indication of the quality of eye-gaze tracking. For example, the tracking quality score may be a measure of a degree of correlation between sequential frames of the speckle patterns. In some embodiments, the tracking quality score may be calculated from the value of a correlation peak. If the correlation between sequential frames is perfect, the value of the correlation peak may be close to unity. If the correlation between sequential frames is poor, perhaps due to blinking, the value of the correlation peak may be significantly lower than unity.

Figures 14A, 14B, 14C:
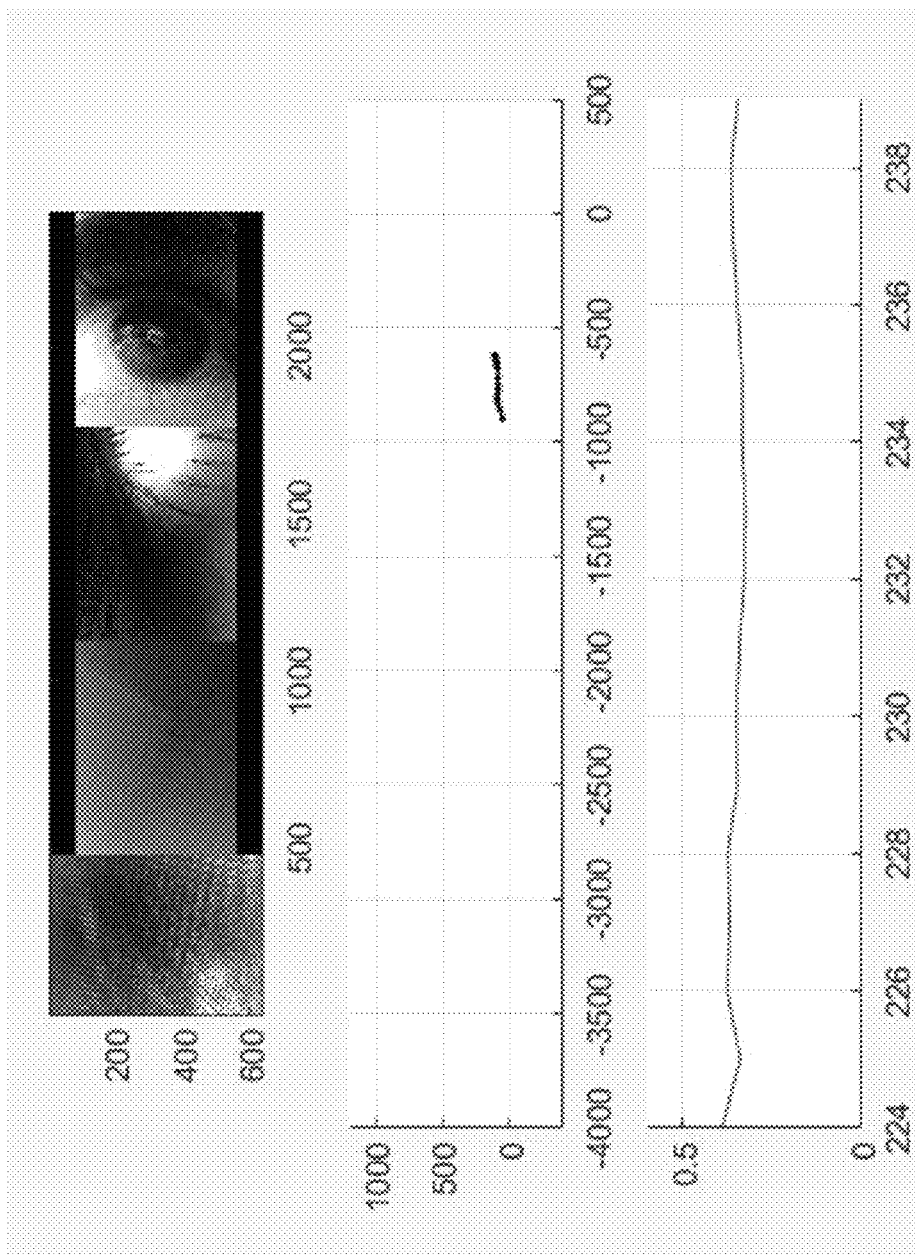
FIG. 14A shows: (i) in the two right panels, snapshots of a front view and a side view of the eye captured by two different eye cameras at the same time; and (ii) in the two left panels, snapshots of the speckle patterns captured by two different detectors, according to an embodiment of the present invention.
FIG. 14B shows a part of a trajectory of the eye movement according to an embodiment of the present invention.
FIG. 14C shows a tracking quality score as a function of time according to an embodiment of the present invention.

FIGS. 14A-14C and 15A-15C illustrate some exemplary results of eye-gaze tracking according to an embodiment of the present invention. The two right panels in FIG. 14A show snapshots of a side view and a front view, respectively, of the eye captured by two different eye cameras. The two left panels of FIG. 14A show snapshots of the speckle patterns captured by two different detectors at the same time the snapshots of the side view and the front view of the eye were captured. FIG. 14B shows a partial trajectory of the eye movement. The horizontal axis and vertical axis in FIG. 14B are horizontal position and vertical position, respectively, of the eye in arbitrary units. FIG. 14C shows the tracking quality score as a function of time. The vertical axis is the tracking quality score in arbitrary units. The horizontal axis is frame number (at 10 ms intervals corresponding to 100 frames per second). As illustrated, the tracking quality score is relatively high for the time period shown. FIGS. 15A-15C are similar to FIGS. 14A-14C but are snapshots of a different time period. As shown in FIG. 15A, the speckle pattern is lost due to blinking of the eye. FIG. 15C shows that the tracking quality score dropped abruptly at about 1060 ms, the moment when the eye started to blink.

As illustrated above, accurate tracking of relative motions of the eye can be achieved by tracking the speckle patterns. But speckle patterns do not provide absolute eye-gaze position of the eye. According to an embodiment of the present invention, an initial absolute eye-gaze position of the eye may be determined by another method such as a camera-based method. After the initial eye-gaze position is determined, speckle tracking is used for more accurate tracking of the movements of the eye relative to the initial eye-gaze position. Similarly, when correlation is lost when the eye blinked, a new initial absolute eye-gaze position may be determined by a camera-based method. After the new initial eye-gaze position is established, speckle tracking may be resumed.

Figure 16:
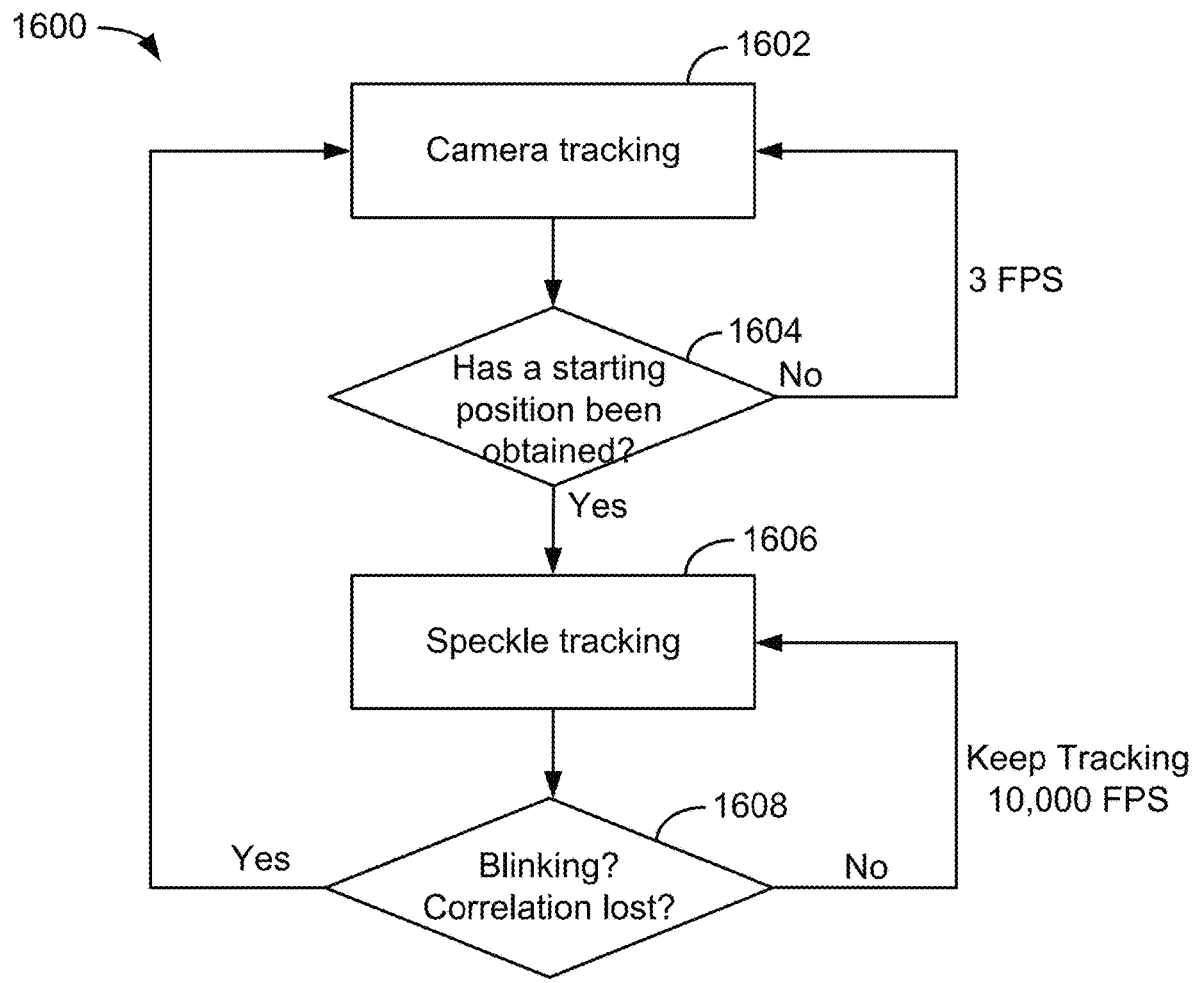
FIG. 16 illustrates a simplified flowchart illustrating a method of eye-gaze tracking according to an embodiment of the present invention.

FIG. 16 illustrates a simplified flowchart illustrating a method 1600 of eye-gaze tracking according to some embodiments of the present invention. The method 1600 includes performing eye-gaze tracking using a camera (1602), and determining if a starting eye-gaze position has been obtained (1604). Eye-gaze tracking using a camera may be performed by recording a plurality of images of the eye using the camera. One of the plurality of images may be selected for determining a starting eye-gaze position. For example, some images may have relatively poor quality perhaps because the eye is blinking. Based on the selected image, a starting eye-gaze position may be determined using a pre-calibrated coordinate system. For example, as illustrated in FIG. 1, the (x, y) coordinates of the center of the pupil may be determined relative to a pre-calibrated origin.

If a starting eye-gaze position has not been obtained, the method 1600 may continue eye-gaze tracking using the camera (1602) until a starting eye-gaze position has been obtained. Once a starting eye-gaze position has been obtained, the method 1600 may start performing eye-gaze tracking using speckle patterns (1606). As discussed above, eye-gaze tracking using speckle patterns may be performed by directing a light beam at the eye, and detecting speckle patterns formed at a detector by a portion of the light beam reflected off of the eye. The light beam may be produced by a coherent light source such as a laser, or by a partially coherent light source such as light emitting diodes (LEDs), so that speckle patterns may be detected. Movement of the eye may be tracked by tracking the speckle patterns from frame to frame using algorithms such as a phase correlation algorithm of an optical flow method.

If the user blinks, the ability to track the eye movement using speckle patterns may be lost due to loss of correlation between sequential frames. Accordingly, the method 1600 further includes determining whether blinking has occurred and whether correlation has been lost as a result of the blinking (1608). In some embodiments, determining whether correlation has been lost may include calculating the value of a correlation peak (as discussed above), and comparing the value of the correlation peak to a pre-determined threshold value. If the value of the correlation peak is equal or higher than the pre-determined threshold value, it may be determined that correlation has not been lost. Conversely, if the value of the correlation peak is lower than the pre-determined threshold value, it may be determined that correlation has been lost.

If it is determined that correlation has not been lost, the method 1600 may continue eye-gaze tracking by tracking speckle patterns (1606). If it is determined that correlation has been lost, the method 1600 may go back to eye-gaze tracking using the camera (1602). When a new starting eye-gaze position is obtained (1604) by using camera tracking, the method 1600 may resume eye-gaze tracking by tracking speckle patterns (1606).

As discussed above, eye-gaze tracking using speckle patterns may be more accurate than eye-gaze tracking using the camera. In some embodiments, the method 1600 may choose the best camera frames for determining starting eye-gaze positions, and perform speckle tracking in between camera frames for better accuracy. In some embodiments, the method 1600 may perform speckle tracking at a fairly high frame rate, e.g., 10,000 fps, and perform camera tracking at a much lower frame rate, e.g., 3 fps.

According to another embodiment of the present invention, an initial absolute eye-gaze position may be obtained by using pre-calibrated speckle patterns. Eye speckle patterns may be unique to each individual. Before tracking eye-gaze of a user, a calibration procedure may be performed for the user. In the calibration procedure, a number of speckle patterns corresponding to various eye-gaze positions of the user may be obtained. The various eye-gaze positions may be determined by camera-based methods or other suitable eye-gaze tracking methods. Thus, a speckle map unique to the user may be obtained and stored in the system. The speckle map may include a plurality of pre-calibrated speckle patterns and their corresponding eye-gaze positions.

Figure 17:
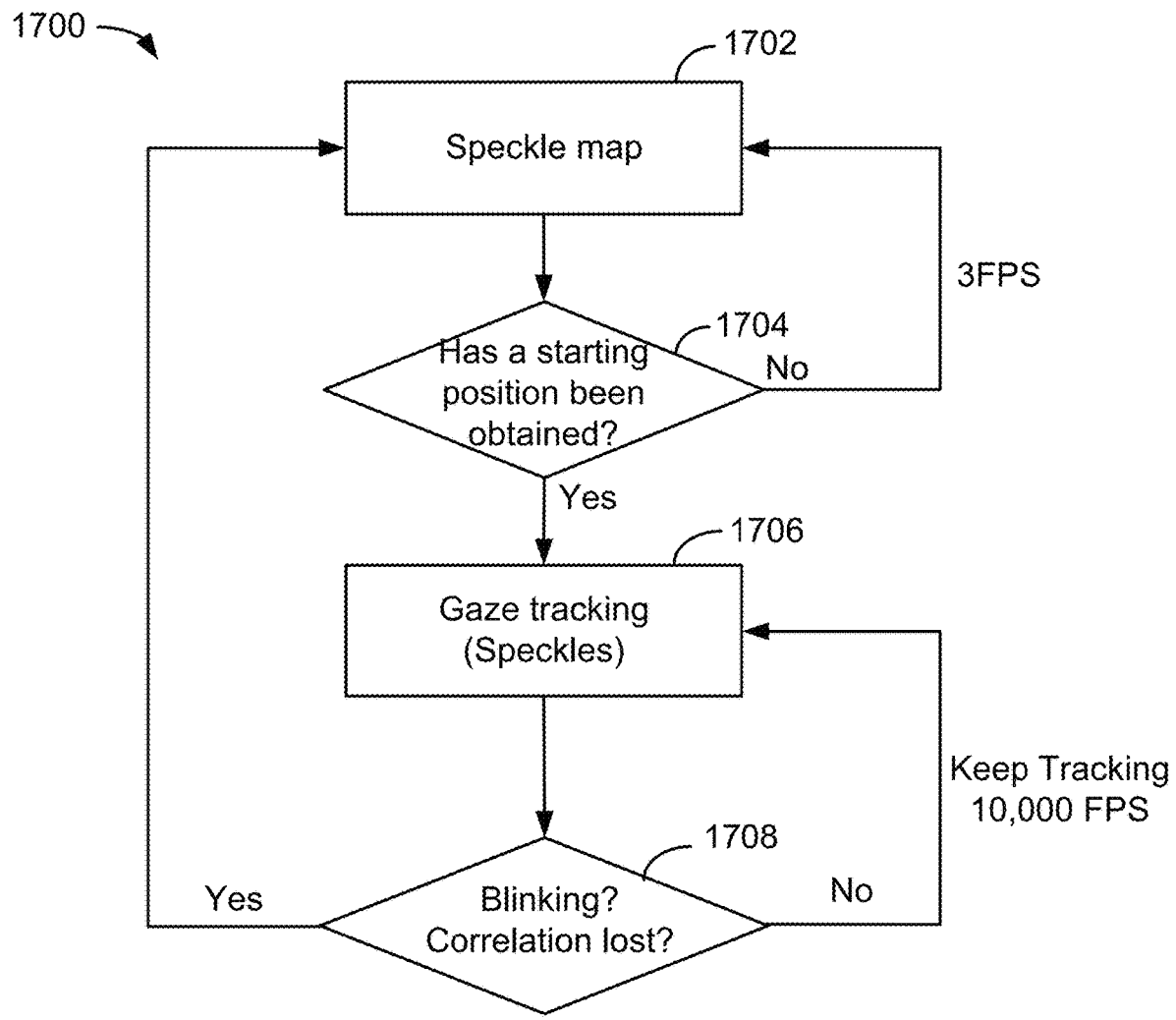
FIG. 17 illustrates a simplified flowchart illustrating a method of eye-gaze tracking according to another embodiment of the present invention.

FIG. 17 illustrates a simplified flowchart illustrating a method 1700 of eye-gaze tracking according to an embodiment of the present invention. The method 1700 includes performing eye-gaze tracking using a pre-calibrated speckle map for a user (1702), and determining if a starting eye-gaze position has been obtained (1704). As discussed above, the speckle map may include a plurality of pre-calibrated speckle patterns and their corresponding eye-gaze positions. A plurality of initial speckle patterns may be obtained by directing a light beam at the eye and detecting the plurality of initial speckle patterns at a detector positioned adjacent the eye. The light beam may be produced by a coherent light source such as a laser, or by a partially coherent light source such as light emitting diodes (LEDs), so that speckle patterns may be detected. The plurality of initial speckle patterns may be compared with the pre-calibrated speckle patterns in the speckle map to determine an initial eye-gaze position. For example, it may be determined that one of the plurality of initial speckle patterns matches a speckle pattern stored in the speckle map for the user. Then the corresponding eye-gaze position for the matching speckle pattern may be used as the starting eye-gaze position.

If a starting position has not been obtained, the method 1700 may continue eye-gaze tracking using the speckle map (1702). Once a starting position is obtained, the system may start tracking eye-gaze relative to the starting eye-gaze position by tracking the speckle patterns (1706). Movement of the eye may be tracked by tracking speckle patterns from frame to frame using algorithms, such as a phase correlation algorithm of an optical flow method.

The method 1700 further includes determining whether a blinking has occurred (1708), and whether correlation has lost as a result of a blinking (1708), similar to the method 1600 discussed above in relation to FIG. 16. If it is determined that correlation has not been lost, the method 1700 may continue speckle tracking (1706). If it is determined that correlation has been lost, the method 1700 may go back to step 1702 to perform eye-gaze tracking using the speckle map (1702). When a new starting position is obtained (1704), the method 1700 may resume speckle tracking (1706). In some embodiments, the method 1700 may perform speckle tracking at a fairly high frame rate, e.g., 10,000 fps, and perform tracking using the speckle map at a much lower frame rate, e.g., 3 fps.

Figure 18:
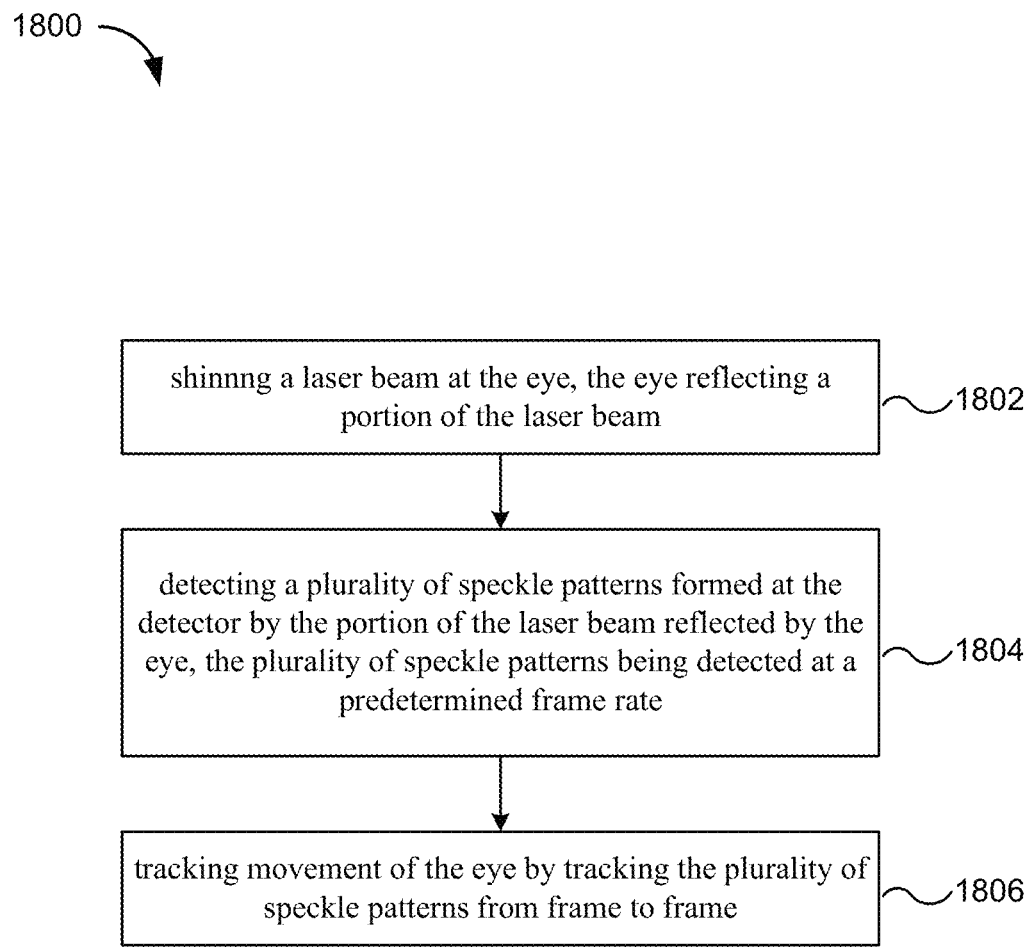
FIG. 18 is a simplified flowchart illustrating a method of tracking movement of an eye of a user according to an embodiment of the present invention.

FIG. 18 is a simplified flowchart illustrating a method 1800 of tracking movement of an eye of a user according to an embodiment of the present invention. The method 1800 includes directing a light beam at the eye (1802). The light beam may be produced by a coherent light source such as a laser, or by a partially coherent light source such as light emitting diodes (LEDs), so that speckle patterns may be detected. The eye may reflect a portion of the light beam. The portion of the light beam reflected by the eye may be diffusely or specular reflected by the eye. The method 1800 further includes detecting a plurality of speckle patterns formed at a detector by the portion of the light beam reflected by the eye (1804). The plurality of speckle patterns is detected at a predetermined frame rate. The method 1800 further includes tracking movement of the eye by tracking the plurality of speckle patterns from frame to frame (1806).

In some embodiments, the predetermined frame rate is greater than about 5,000 frames per second and less than about 15,000 frames per second. In one embodiment, the predetermined frame rate is about 10,000 frames per second. In some other embodiments, the predetermined frame rate is greater than about 50 frames per second and less than about 15,000 frames per second. In some embodiments, tracking the plurality of speckle patterns is performed using an optical flow algorithm. In one embodiment, the optical flow algorithm uses a phase correlation method.

Figure 19:
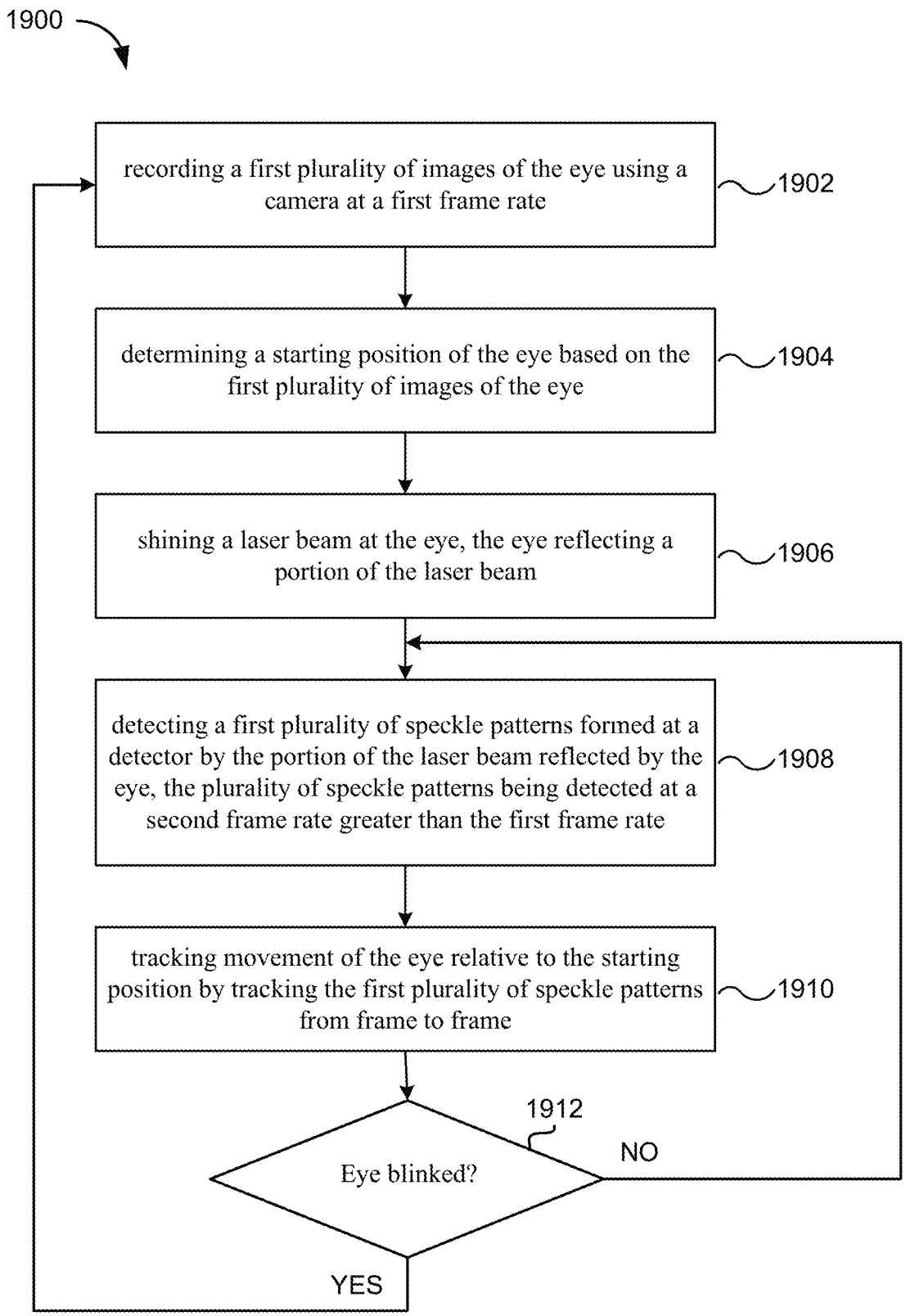
FIG. 19 is a simplified flowchart illustrating a method of tracking a gaze of an eye of a user according to an embodiment of the present invention.

FIG. 19 is a simplified flowchart illustrating a method 1900 of tracking a gaze of an eye of a user according to an embodiment of the present invention. The method 1900 includes recording a first plurality of images of the eye using a camera at a first frame rate (1902); and determining a starting position of the eye based on the first plurality of images of the eye (1904). In some embodiments, one of the first plurality of images may be selected for determining a starting position of the eye. Based on the selected image, a starting position of the eye may be determined using a pre-calibrated coordinate system. For example, as illustrated in FIG. 1, the (x, y) coordinates of the center of the pupil may be determined relative to a pre-calibrated origin.

The method 1900 may further include directing a light beam at the eye (1906). The light beam may be produced by a coherent light source such as a laser, or by a partially coherent light source such as light emitting diodes (LEDs). The eye may reflect a portion of the light beam. The portion of the light beam reflected by the eye may be diffusely or specular reflected by the eye. The method 1900 may further include detecting a first plurality of speckle patterns formed at the detector by the portion of the light beam reflected by the eye (1908), and tracking movement of the eye relative to the starting position by tracking the first plurality of speckle patterns from frame to frame (1910). In some embodiments, the plurality of speckle patterns are detected at a second frame rate greater than the first frame rate. In some embodiments, the first frame rate is less than about 10 fps, and the second frame rate is greater than about 50 fps and less than about 15,000 fps. In one embodiment, the first frame rate is about 3 frames per second, and the second frame rate is about 10,000 frames per second.

In some embodiments, the method 1900 may further include determining that the eye has blinked (1920). For example, it may be determined whether the eye has blinked based on a tracking quality score as discussed above in relation to FIGS. 16 and 17. The method 1900 may go back to step 1902 to determine a new starting position in response to determining that the eye has blinked. For example, the method 1900 may include determining a new starting position by: recording a second plurality of images of the eye using the camera, and determining the new starting position based on the second plurality of images of the eye; and tracking movement of the eye relative to the new starting position by: detecting a second plurality of speckle patterns formed at the detector at the second frame rate, and tracking the second plurality of speckle patterns from frame to frame. If it is determined that that the eye has not blinked, the method 1900 may continue with steps 1908 and 1910.

Figure 20:
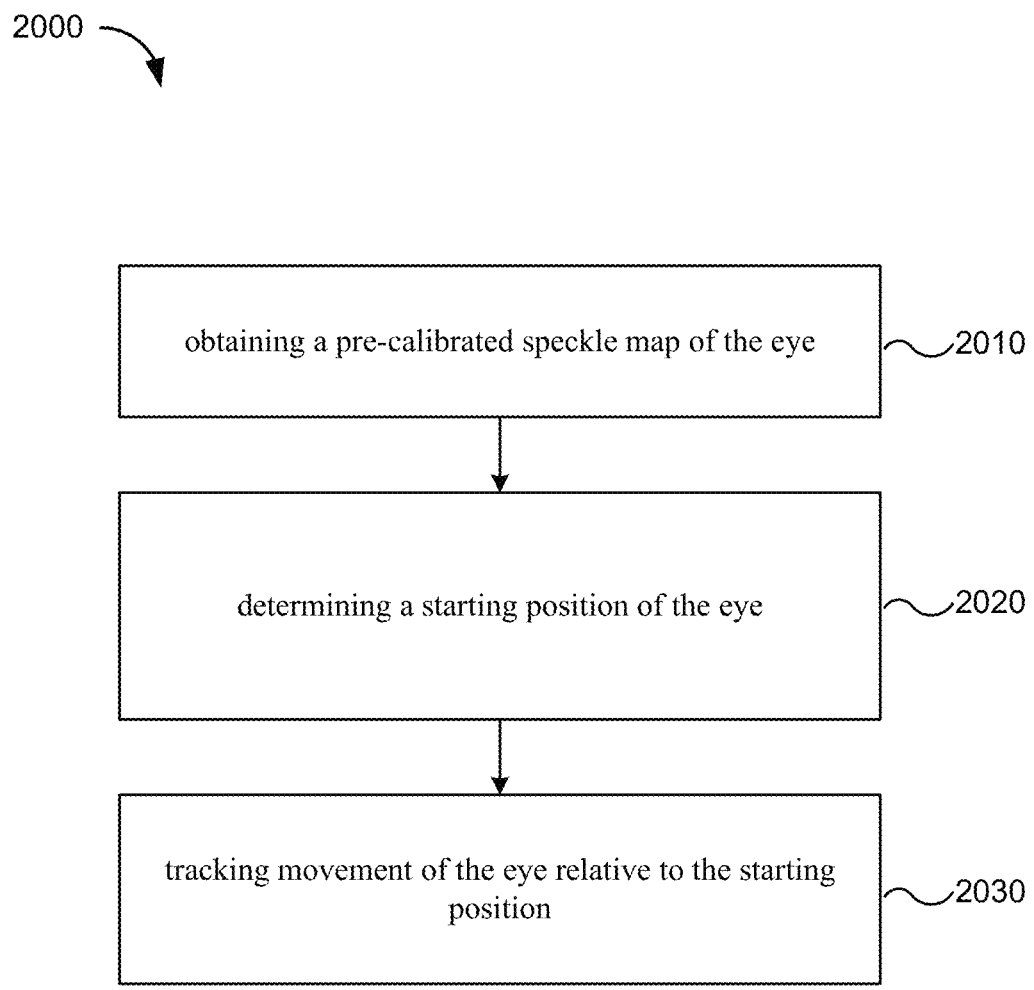
FIG. 20 is a simplified flowchart illustrating a method of tracking a gaze of an eye of a user according to another embodiment of the present invention.

FIG. 20 is a simplified flowchart illustrating a method 2000 of tracking a gaze of an eye of a user according to some embodiments of the present invention. The method 2000 may include obtaining a pre-calibrated speckle map of the eye of the user (2010), determining a starting position of the eye using the pre-calibrated speckle map (2020), and tracking movement of the eye relative to the starting position (2030), as further described below in relation to FIGS. 21-23.

Figure 21:
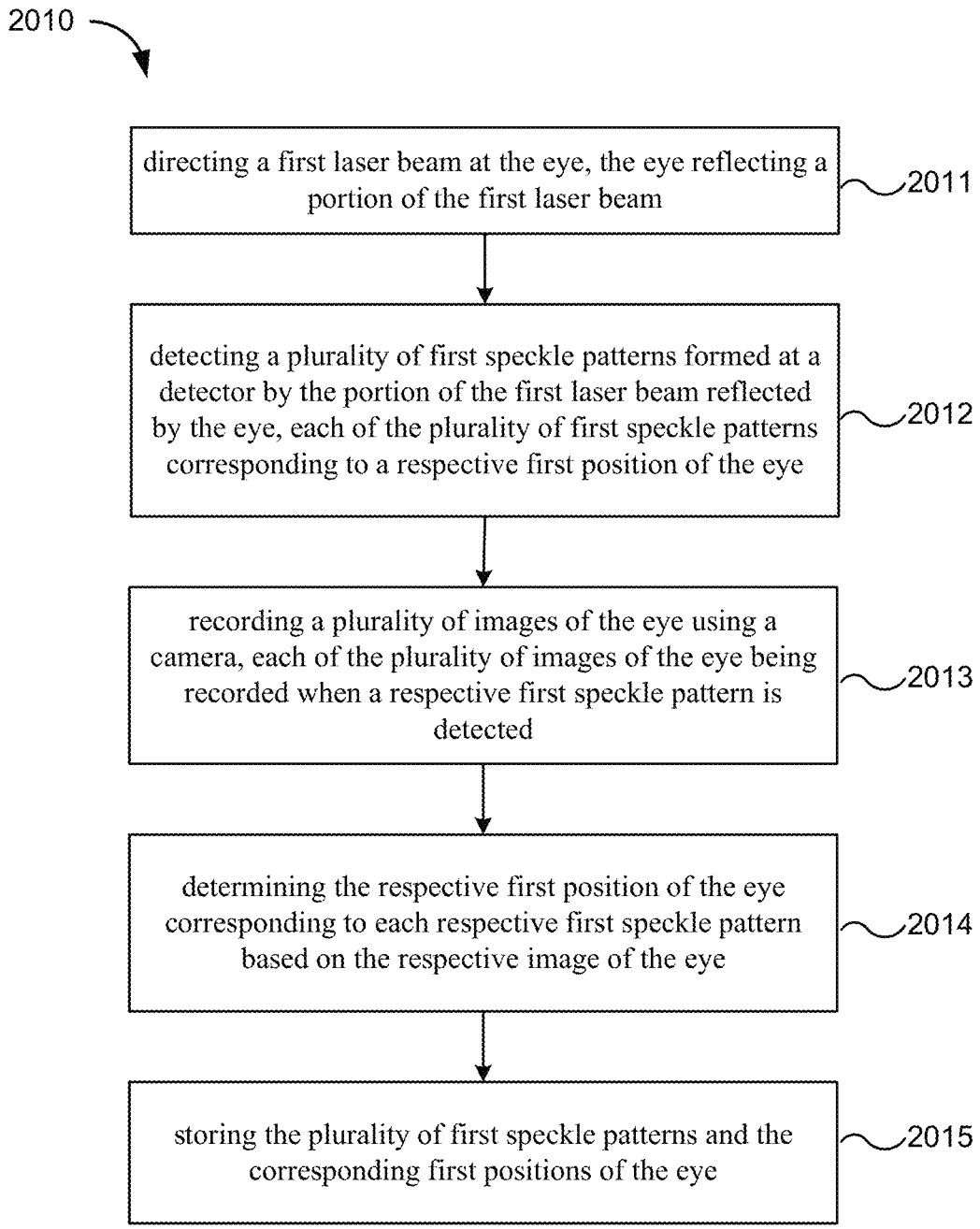
FIG. 21 is a simplified flowchart illustrating a method of obtaining a pre-calibrated speckle map of the eye of the user according to an embodiment of the present invention.

FIG. 21 is a simplified flowchart illustrating a method 2010 of obtaining a pre-calibrated speckle map of the eye of the user according to an embodiment of the present invention. The method 2010 includes directing a first light beam at the eye (2011). The first light beam may be produced by a coherent light source such as a laser, or by a partially coherent light source such as light emitting diodes (LEDs). The eye may reflect a portion of the first light beam. The method 2010 further includes detecting a plurality of first speckle patterns formed at a detector by the portion of the first light beam reflected by the eye (2012). Each of the plurality of first speckle patterns corresponds to a respective first position of the eye. The method 2010 further includes recording a plurality of images of the eye using a camera (2013). Each of the plurality of images of the eye is recorded when a respective first speckle pattern is detected. The method 2010 further includes determining the respective first position of the eye corresponding to each respective first speckle pattern based on the respective image of the eye (2014), and storing the plurality of first speckle patterns and the corresponding first positions of the eye (2015).

Figure 22:
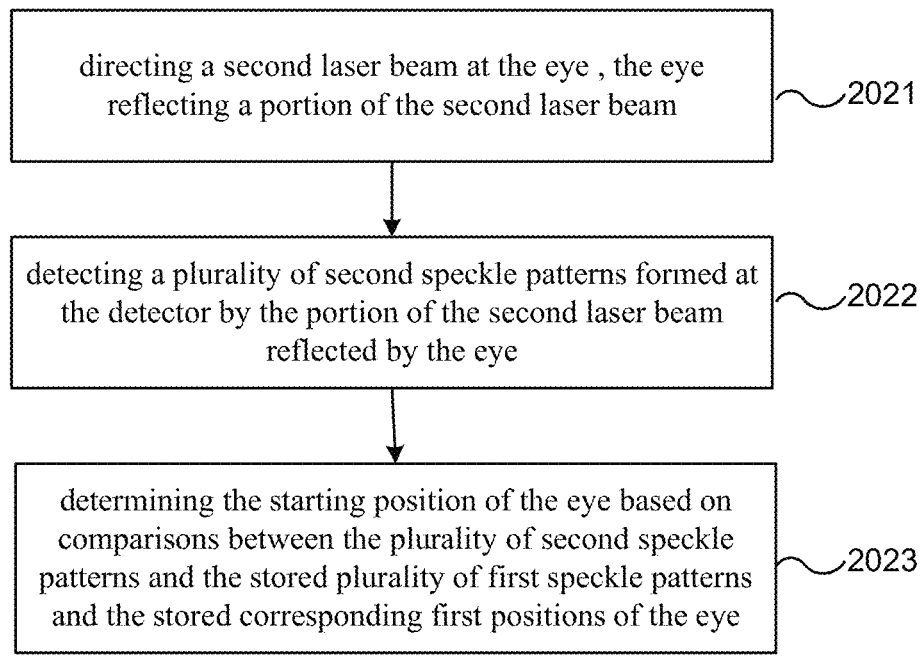
FIG. 22 is a simplified flowchart illustrating a method of determining a starting position of the eye using the pre-calibrated speckle map according to an embodiment of the present invention.

FIG. 22 is a simplified flowchart illustrating a method 2020 of determining a starting position of the eye using the pre-calibrated speckle map according to an embodiment of the present invention. The method 2020 includes directing a second light beam at the eye (2021). The second light beam may be produced by a coherent light source such as a laser, or by a partially coherent light source such as light emitting diodes (LEDs). The eye may reflect a portion of the second light beam. The method 2020 further includes detecting a plurality of second speckle patterns formed at the detector by the portion of the second light beam reflected by the eye (2022), and determining the starting position of the eye based on comparisons between the plurality of second speckle patterns and the stored plurality of first speckle patterns and the stored corresponding first positions of the eye (2023).

Figure 23:
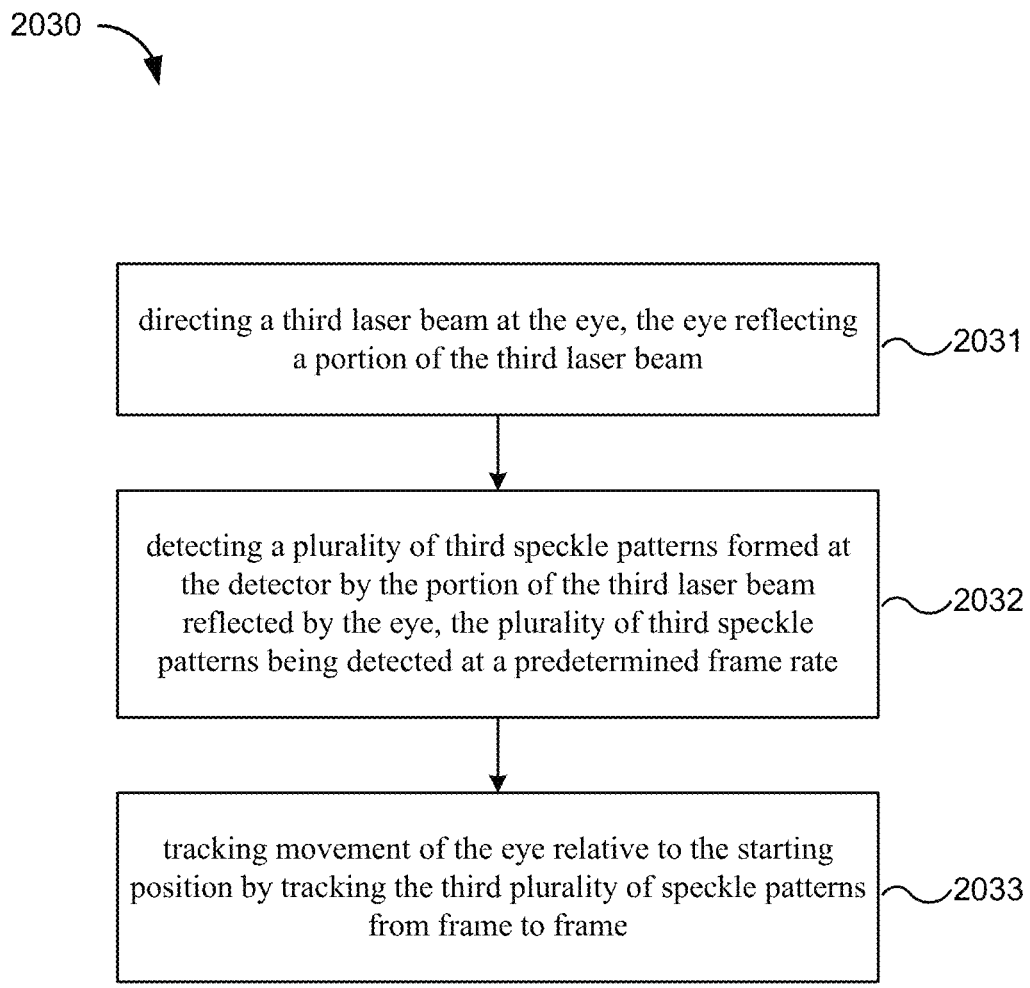
FIG. 23 is a simplified flowchart illustrating a method of tracking movement of the eye relative to the starting position according to an embodiment of the present invention.

FIG. 23 is a simplified flowchart illustrating a method 2030 of tracking movement of the eye relative to the starting position according to an embodiment of the present invention. The method 2030 includes directing a third light beam at the eye (2031). The third light beam may be produced by a coherent light source such as a laser, or by a partially coherent light source such as light emitting diodes (LEDs). The eye may reflect a portion of the third light beam. The method 2030 further includes detecting a plurality of third speckle patterns formed at the detector by the portion of the third light beam reflected by the eye (2032). The plurality of third speckle patterns being detected at a predetermined frame rate. The method 2030 further includes tracking movement of the eye relative to the starting position by tracking the third plurality of speckle patterns from frame to frame.

Figure 24:
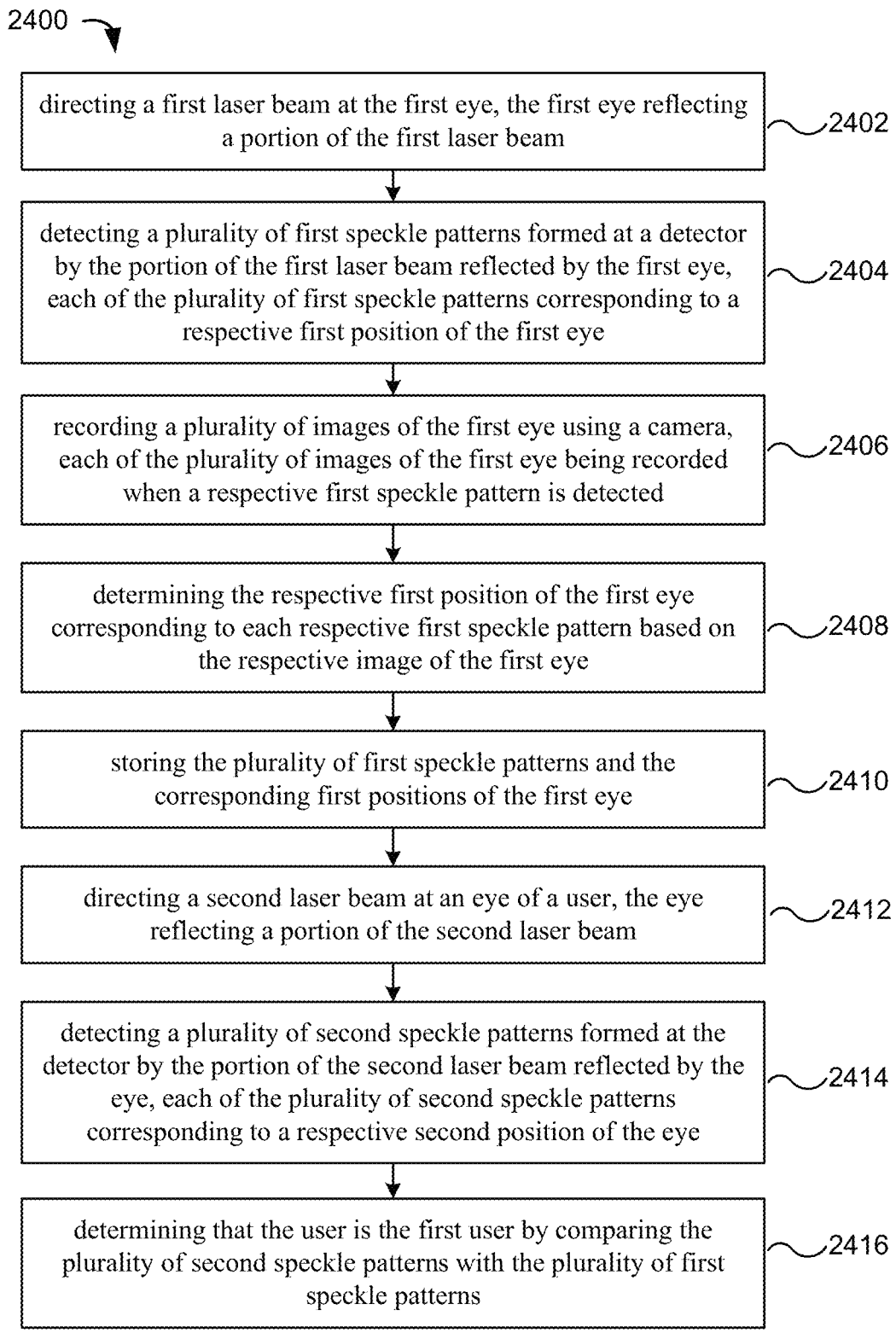
FIG. 24 is a simplified flowchart illustrating a method of identification of a user according to an embodiment of the present invention.

As discussed above, eye speckle patterns may be unique to each individual. Thus, eye speckle patterns can be used for user identification. FIG. 24 is a simplified flowchart illustrating a method 2400 of identification of a user according to an embodiment of the present invention. The method 2400 includes directing a first light beam at the first eye (2402). The first light beam may be produced by a coherent light source such as a laser, or by a partially coherent light source such as light emitting diodes (LEDs). The first eye may reflect a portion of the first light beam. The method 2400 further includes detecting a plurality of first speckle patterns formed at a detector by the portion of the first light beam reflected by the first eye (2404). Each of the plurality of first speckle patterns corresponds to a respective first position of the first eye. The method 2400 further includes recording a plurality of images of the first eye using a camera (2406). Each of the plurality of images of the first eye is recorded when a respective first speckle pattern is detected. The method 2400 further includes determining the respective first position of the first eye corresponding to each respective first speckle pattern based on the respective image of the first eye (2408), and storing the plurality of first speckle patterns and the corresponding first positions of the first eye (2410). The method 2400 further includes directing a second light beam at an eye of a user (2412). The second light beam may be produced by a coherent light source such as a laser, or by a partially coherent light source such as light emitting diodes (LEDs). The eye may reflect a portion of the second light beam. The method 2400 further includes detecting a plurality of second speckle patterns formed at the detector by the portion of the second light beam reflected by the eye (2414). Each of the plurality of second speckle patterns corresponds to a respective second position of the eye. The method 2400 further includes determining that the user is the first user by comparing the plurality of second speckle patterns with the plurality of first speckle patterns (2416).

It should be appreciated that the specific steps illustrated in each of FIGS. 16-24 provide a particular method according to an embodiment of the present invention. Other sequences of steps may also be performed according to alternative embodiments. For example, alternative embodiments of the present invention may perform the steps outlined above in a different order. Moreover, the individual steps illustrated in FIGS. 16-24 may include multiple substeps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of tracking movement of an eye gaze of a user, the method comprising:
   recording a video image of an eye of the user using a camera, the video image showing movement of a pupil of the eye;
   determining a starting eye gaze based on the video image of the eye, the starting eye gaze characterized by coordinates of a center of the pupil relative to a pre-calibrated origin;
   in response to determining the starting eye gaze:
      propagating a light beam directly from a light source onto the eye;
      detecting a speckle pattern formed on a detector by a portion of the light beam reflected by the eye, the speckle pattern being detected at a predetermined frame rate; and
      tracking movement of the eye gaze relative to the starting eye gaze by tracking the speckle pattern from frame to frame;
   determining that the eye has blinked;
   determining a new starting eye gaze by:
      recording a second video image of the eye using the camera; and
      determining the new starting eye gaze based on the second video image of the eye; and
   tracking movement of the eye gaze relative to the new starting eye gaze by:
      detecting a second speckle pattern formed at the detector; and
      tracking the second speckle pattern from frame to frame.

2. The method of claim 1 wherein the portion of the light beam reflected by the eye is diffusely reflected or specular reflected by the eye.

3. The method of claim 1 wherein the predetermined frame rate is greater than about 5,000 frames per second and less than about 15,000 frames per second.

4. The method of claim 3 wherein the predetermined frame rate is about 10,000 frames per second.

5. The method of claim 1 wherein the predetermined frame rate is greater than about 50 frames per second and less than about 15,000 frames per second.

6. The method of claim 1 wherein tracking the speckle pattern is performed using an optical flow algorithm.

7. The method of claim 6 wherein the optical flow algorithm comprises a phase correlation algorithm.

8. The method of claim 1 wherein the light beam comprises infrared radiation.

9. The method of claim 1 wherein the portion of the light beam reflected by the eye propagates directly from the eye to the detector.

10. The method of claim 1 wherein the light beam propagates to the eye at a slanted angle relative to the eye.

11. The method of claim 1 wherein:
   the light source is mounted to a temple of an eyeglass worn by the user; and
   the detector is mounted to the temple adjacent to the light source.

12. A method of tracking a gaze of an eye of a user, the method comprising:
   recording a first video image of the eye using a camera at a first frame rate, the first video image showing movement of a pupil of the eye;
   determining a starting gaze of the eye based on the first video image of the eye, the starting gaze characterized by coordinates of a center of the pupil relative to a pre-calibrated origin;
   in response to determining the starting gaze of the eye:
      propagating a light beam directly from a light source onto the eye;
      detecting a first speckle pattern formed at a detector by a portion of the light beam reflected by the eye, the first speckle pattern being detected at a second frame rate greater than the first frame rate; and
      tracking movement of the gaze of the eye relative to the starting gaze of the eye by tracking the first speckle pattern from frame to frame;
   determining that the eye has blinked;
   determining a new starting gaze of the eye by:
      recording a second video image of the eye using the camera; and
      determining the new starting gaze of the eye based on the second video image of the eye; and
   tracking movement of the gaze of the eye relative to the new starting gaze of the eye by:
      detecting a second speckle pattern formed at the detector at the second frame rate; and tracking the second speckle pattern from frame to frame.

13. The method of claim 12 wherein the portion of the light beam reflected by the eye is diffusely reflected or specular reflected by the eye.

14. The method of claim 12 wherein tracking the first speckle pattern is performed using an optical flow algorithm.

15. The method of claim 14 wherein the optical flow algorithm comprises a phase correlation algorithm.

16. The method of claim 12 wherein the first frame rate is less than about 10 frames per second, and the second frame rate is greater than about 50 frames per second and less than about 15,000 frames per second.

17. A method of tracking movement of an eye gaze of a user, the method comprising:
   recording a video image of an eye of the user using a camera, the video image showing movement of a pupil of the eye;
   determining a starting eye gaze based on the video image of the eye, the starting eye gaze characterized by coordinates of a center of the pupil relative to a pre-calibrated origin;
   in response to determining the starting eye gaze:
      illuminating an eye with coherent light at a slanted angle relative to the eye;
      propagating a portion of the coherent light scattered by the eye from the eye to an image sensor;
      detecting a speckle pattern formed on the image sensor by the portion of the coherent light scattered by the eye, the speckle pattern being detected at a predetermined frame rate; and
      tracking movement of the eye gaze relative to the staring eye gaze by tracking the speckle pattern from frame to frame;
   determining that the eye has blinked;
   determining a new starting eye gaze by:
      recording a second video image of the eye using the camera; and
      determining the new starting eye gaze based on the second video image of the eye; and
   tracking movement of the eye gaze relative to the new starting eye gaze by:
      detecting a second speckle pattern formed at image sensor; and
      tracking the second speckle pattern from frame to frame.

18. The method of claim 17, wherein the portion of the coherent light reflected by the eye propagates directly from the eye to the image sensor.

19. The method of claim 17, wherein:
   the coherent light is generated by a light source mounted on a temple of an eyeglass worn by the user; and
   the image sensor is mounted on the temple adjacent to the light source.

* * * * *